(12) United States Patent
De Meerleer

(10) Patent No.: US 10,288,995 B2
(45) Date of Patent: May 14, 2019

(54) ASPHERICAL DOME DISPLAY AND METHOD OF REAR PROJECTION

(71) Applicant: ESTERLINE BELGIUM BVBA, Kortrijk (BE)

(72) Inventor: Peter De Meerleer, Lokeren (BE)

(73) Assignee: ESTERLINE BELGIUM BVBA (BE)

( * ) Notice: Subject to any disclaimer, the term of this patent is extended or adjusted under 35 U.S.C. 154(b) by 0 days.

(21) Appl. No.: 15/623,789

(22) Filed: Jun. 15, 2017

(65) Prior Publication Data
US 2018/0364462 A1    Dec. 20, 2018

(51) Int. Cl.
| | |
|---|---|
| *G03B 21/56* | (2006.01) |
| *G02B 17/06* | (2006.01) |
| *G03B 37/04* | (2006.01) |
| *G09B 9/30* | (2006.01) |
| *G09B 9/32* | (2006.01) |
| *G02B 13/06* | (2006.01) |
| *G06T 3/00* | (2006.01) |

(52) U.S. Cl.
CPC ............. *G03B 21/56* (2013.01); *G02B 13/06* (2013.01); *G02B 17/061* (2013.01); *G03B 37/04* (2013.01); *G09B 9/302* (2013.01); *G09B 9/32* (2013.01); *G06T 3/0018* (2013.01)

(58) Field of Classification Search
CPC ...... G02B 17/061; G02B 13/06; G09B 9/302; G09B 9/32; G03B 21/56; G03B 37/04; G06T 3/0018
See application file for complete search history.

(56) References Cited

U.S. PATENT DOCUMENTS

| | | | |
|---|---|---|---|
| 1,783,973 A | 12/1930 | Newman | |
| 3,712,707 A | 1/1973 | Henkes, Jr. | |
| 3,832,032 A | 8/1974 | Shimada | |
| 4,473,355 A | 9/1984 | Pongratz | |
| 4,597,633 A | 7/1986 | Fussell | |
| 5,023,725 A | 6/1991 | McCutchen | |

(Continued)

FOREIGN PATENT DOCUMENTS

| | | |
|---|---|---|
| CN | 1890601 A | 1/2007 |
| EP | 1152286 A1 | 11/2001 |

(Continued)

OTHER PUBLICATIONS

Office Action in related U.S. Appl. No. 15/368,978, dated Jan. 11, 2018.

(Continued)

*Primary Examiner* — Sultan Chowdhury
*Assistant Examiner* — Magda Cruz
(74) *Attorney, Agent, or Firm* — RatnerPrestia

(57) ABSTRACT

A non-spherical projection display structure and system that can be optimized for the ergonomics of preferably one viewer inside the display structure or system. The structure or system is preferably for use with widescreen projectors. The non-spherical projection display structure and system creates a visual projection display and method of operating the display that has a wide horizontal and vertical field of view and uses a rear projected display structure having a projection screen surface with a thickness. The display structure has at least one section with a monotonically increasing or decreasing radius of curvature.

21 Claims, 15 Drawing Sheets

(56) References Cited

U.S. PATENT DOCUMENTS

| | | |
|---|---|---|
| 5,137,450 A | 8/1992 | Thomas |
| 5,179,440 A | 1/1993 | Loban et al. |
| 5,708,527 A | 1/1998 | Adamson et al. |
| 5,926,153 A | 7/1999 | Ohishi et al. |
| 6,347,012 B1 | 2/2002 | Monson et al. |
| 6,644,816 B1 | 11/2003 | Perra et al. |
| 6,747,796 B1 | 6/2004 | Dorling |
| 6,862,139 B2 | 3/2005 | Chang et al. |
| 6,906,860 B2 | 6/2005 | Starkweather |
| 8,049,960 B1 | 11/2011 | Ligon |
| 8,300,311 B2 | 10/2012 | Jelusic et al. |
| 9,110,358 B1 | 8/2015 | Vorst et al. |
| 9,188,850 B2 | 11/2015 | Turner et al. |
| 9,513,541 B2 | 12/2016 | Vermeirsch et al. |
| 2001/0053966 A1* | 12/2001 | Creek .............. G03B 21/56 703/6 |
| 2003/0072080 A1 | 4/2003 | Ariyoshi et al. |
| 2005/0128579 A1 | 6/2005 | Thomas et al. |
| 2007/0009862 A1 | 1/2007 | Quinn et al. |
| 2008/0311351 A1 | 12/2008 | Hsu |
| 2009/0147365 A1 | 9/2009 | Inokuma |
| 2012/0148936 A1 | 6/2012 | Uensal |
| 2012/0169999 A1 | 7/2012 | Cavendish et al. |
| 2012/0218170 A1 | 8/2012 | Streid et al. |
| 2012/0257411 A1 | 10/2012 | Yokota |
| 2013/0308183 A1* | 11/2013 | Vermeirsch .......... G03B 21/62 359/451 |
| 2014/0232613 A1 | 8/2014 | Fox et al. |
| 2018/0139420 A1* | 5/2018 | Liu .................... G03B 21/60 |

FOREIGN PATENT DOCUMENTS

| | | |
|---|---|---|
| EP | 1 302 787 A2 | 4/2003 |
| EP | 2622409 | 8/2013 |
| JP | H08-271979 A | 10/1996 |
| JP | 11-84312 A | 3/1999 |
| JP | H11-352906 A | 12/1999 |
| JP | 2001-311807 A | 11/2001 |
| JP | 2003-121609 A | 4/2003 |
| JP | 2005-502088 A | 1/2005 |
| JP | 2007-047757 A | 2/2007 |
| JP | 2013-539078 A | 10/2013 |
| WO | 2010083993 A1 | 7/2010 |
| WO | 2012/040797 A1 | 4/2012 |
| WO | 2012040797 A1 | 4/2012 |
| WO | 2017024661 A1 | 2/2017 |

OTHER PUBLICATIONS

International Search Report for PCT/BE2010/000074, dated Jun. 20, 2011.

International Preliminary Report on Patentability (PCT/IB/326) in PCT/BE2010/000074, dated Apr. 11, 2013.

Japanese Office Action dated Apr. 8, 2014 for JP 2013-530495 and English translation thereof.

Chinese Office Action dated Oct. 15, 2017, for CN 2010800703755, and English translation thereof.

"Tactical Training, IAF seeks more realism when it comes to practising air raids," Aviation Week & Space Tech, pp. 64-65, Aug. 2, 2010 (Wall) (Appendix B).

"Belgian firm unveils new Top Gun flight simulator," http://www.reuters.com/article/2011/10/12-us-belgium-simulator-dUSTRE79B3Du20111012, Oct. 12, 2011 (Appendix C).

"Fighter jet training dome shows 360-degree view," http://phys.org/news/2011-10-fighter-jet-dome-degree-view.html, Oct. 16, 2011 (Owano) (Appendix D).

Japanese Office Action dated Jan. 26, 2016, for JP 2015-054401, and English translation thereof.

Japanese Office Action dated Nov. 22, 2016, for JP 2015-054401 and English translation thereof.

Ed Lantz, "A survey of large-scale immersive displays" published by ACM SIGGRAPH in the Emerging Display Technology Conference Proceedings, Aug. 2007.

European Search Report dated Jun. 6, 2017, for EP 10813097.2.

Japanese Office Action dated Jul. 10, 2017, for JP 2015-054401.

"Aspherical dome display and method of rear projection", M. Born and E. Wolf, Principles of Optics, Seventh Edition, Cambridge University Press (First published 1959), pp. 572-576.

"Optical Transfer Function", retrieved from https://en.wikipedia.org/wiki/Optical_transfer_function, (access date of Jun. 15, 2017).

"Speckle-free rear-projection screen using two close screens in slow relative motion", E. Rowson, K. Nafarrate, R. Norton, J. Goodman, J. Opt. Soc. Am. vol. 66, No. 11, Nov. 1976.

P.G.J. Barten, "Contrast Sensitivity of the human eye and its effects on image quality", ISBN 90-9012613-9, p. 157, (1999).

International Search Report for PCT Application No. PCT/EP2018/065952, dated Sep. 5, 2018.

* cited by examiner

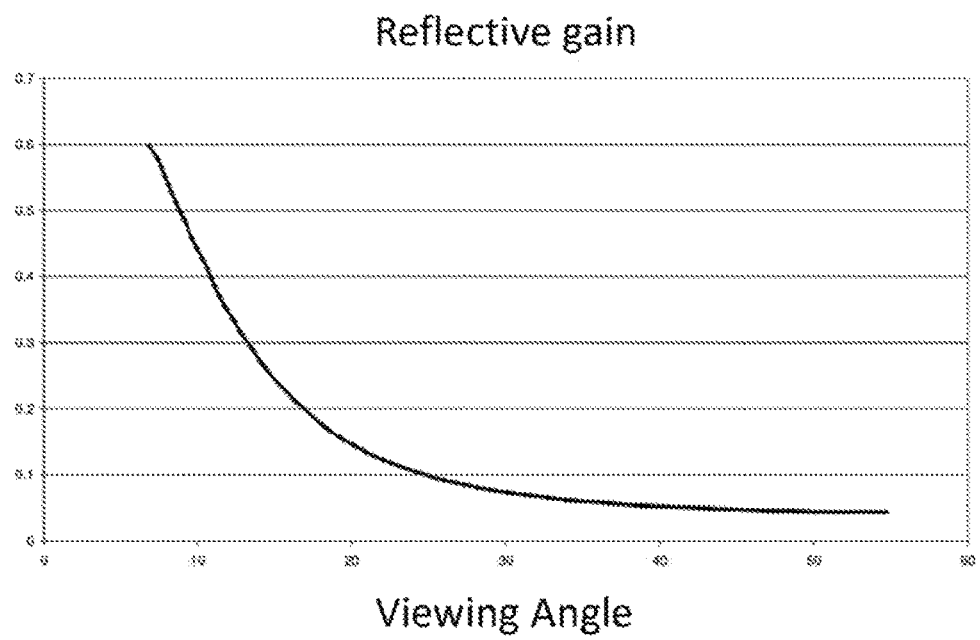
Fig. 9
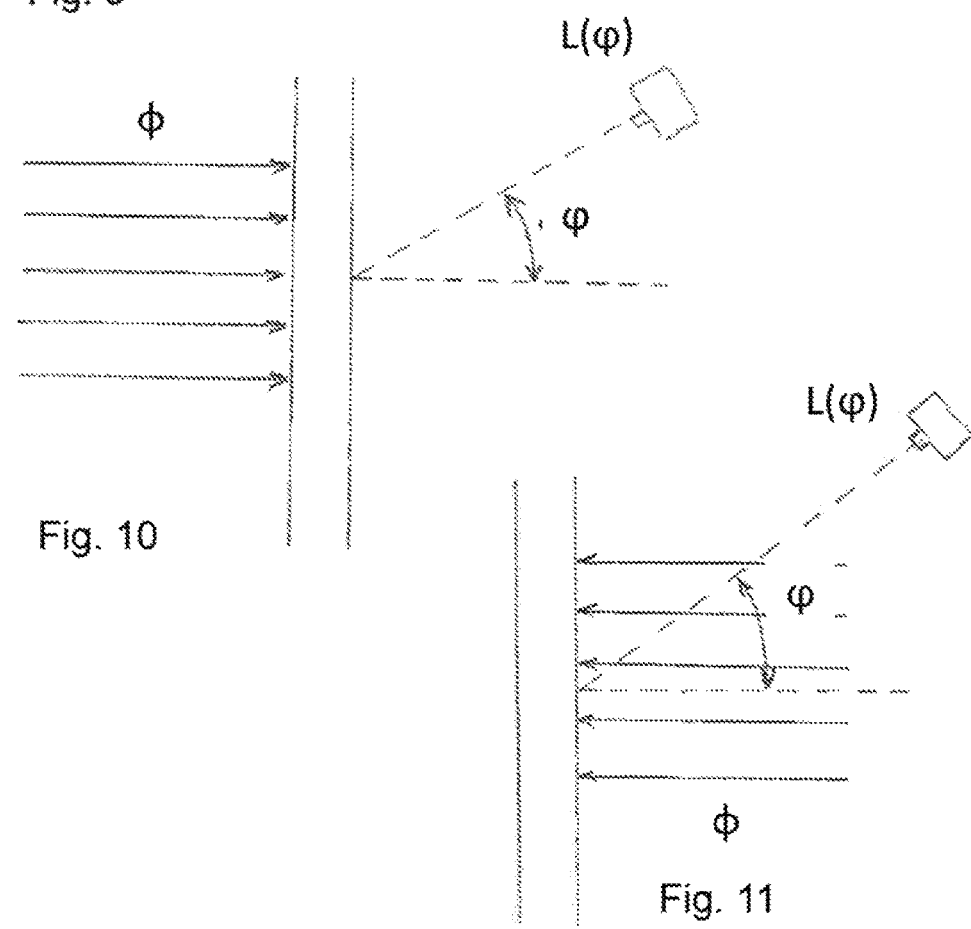
Fig. 10
Fig. 11

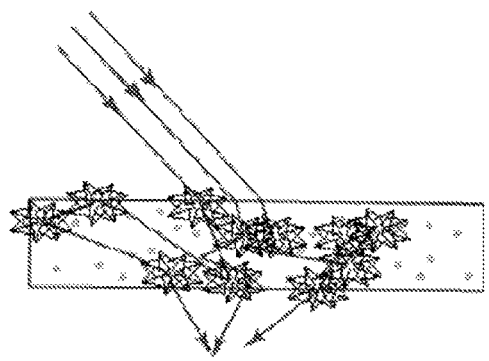
Fig. 18
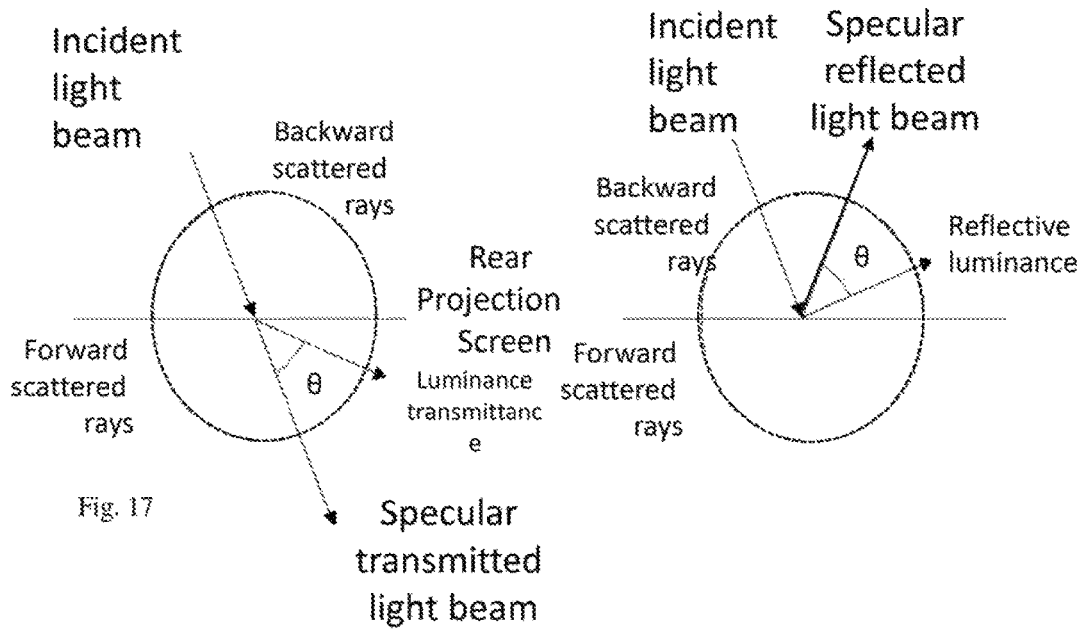
Fig. 19A
Fig. 19B

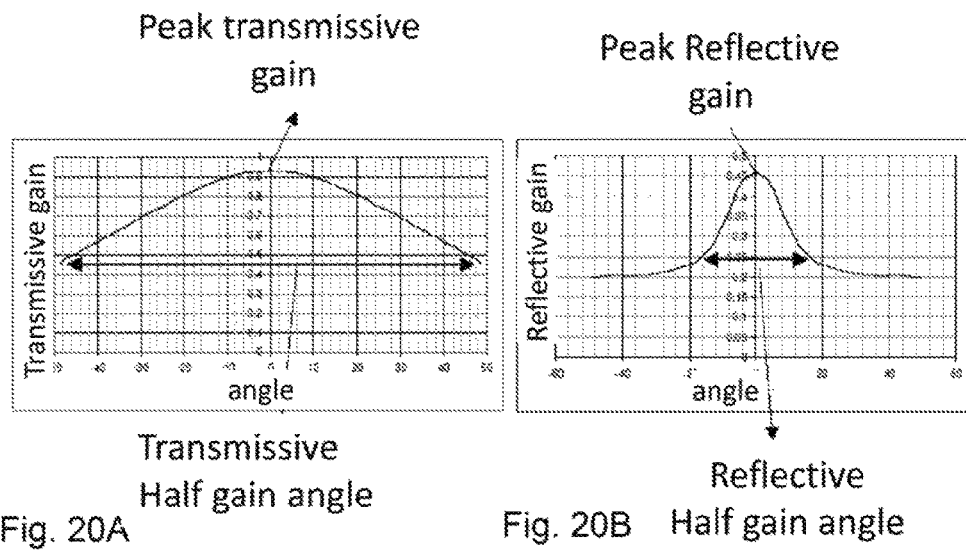
Fig. 20A Transmissive Half gain angle
Fig. 20B Reflective Half gain angle
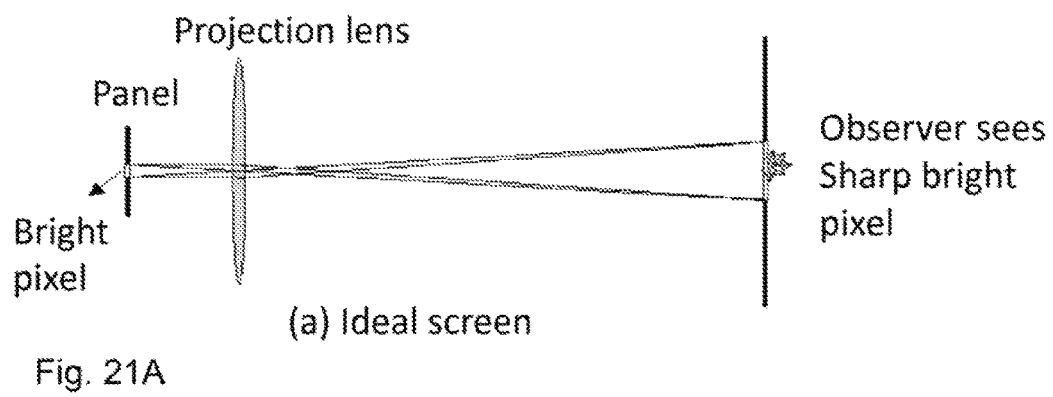
(a) Ideal screen
Fig. 21A
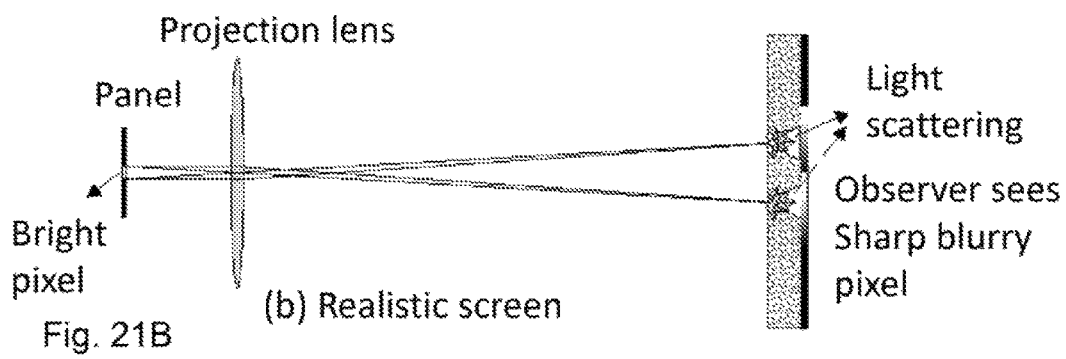
(b) Realistic screen
Fig. 21B

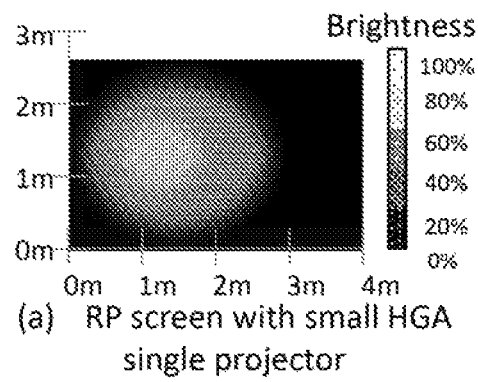
(a) RP screen with small HGA single projector
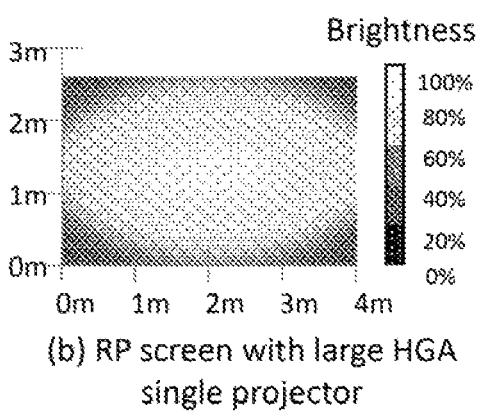
(b) RP screen with large HGA single projector
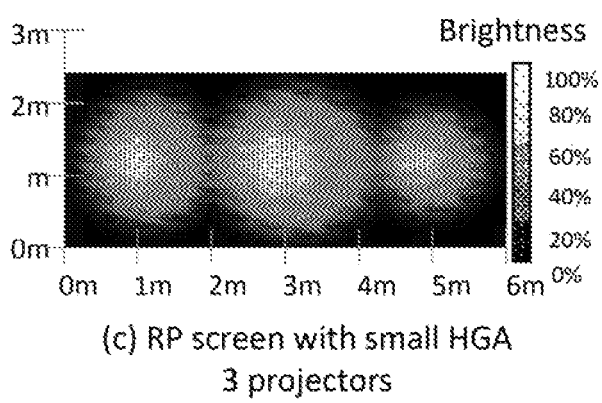
(c) RP screen with small HGA 3 projectors
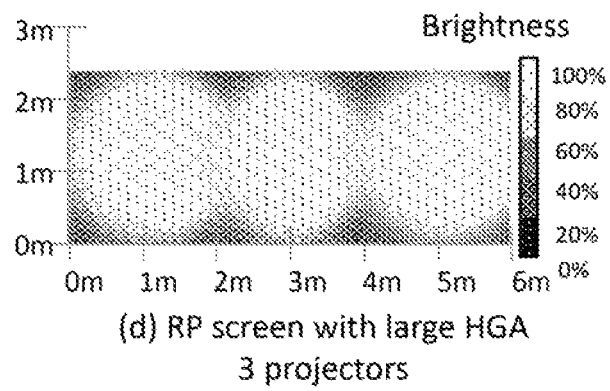
(d) RP screen with large HGA 3 projectors

ASPHERICAL DOME DISPLAY AND METHOD OF REAR PROJECTION

FIELD OF THE INVENTION

The present invention pertains to the field of non-spherical projection displays having a wide horizontal and vertical field of view, the displays being for use with rear projection devices.

BACKGROUND

Immersive visual systems are widely used in simulation applications to create out of the window images for pilots or drivers or to create visually surrounding virtual images for one or multiple users.

Currently, there are four main techniques to create large field of view immersive visual display systems.

The first known technique to generate an immersive visual display system with a large field of view is by projecting, with a plurality of projectors, on the front of a spherical surface. The advantage of front projected systems is that they have a compact footprint but their projector placement is complex and widescreen projectors are used in a less optimal way resulting in systems with a lower resolution. Pilots viewing from inside the spherical surface experience very good ergonomics as the distance between the pilot's eyes and the screen is almost constant, independent of the angle at which the pilot looks at the screen.

The second technique consists in projecting onto a rear projected spherical surface with multiple projectors. The advantage of rear projected spherical displays is the fact that the projectors are positioned around the rear projected screens and therefore illuminate the screen in a more uniform way resulting in a display that has a more uniform and higher resolution. Widescreen projectors with aspect ratios of more than 1.34 typically cannot be matched very optimally with a spherical screen resulting in a lot of loss of pixels and brightness. The projectors can be hard edged or soft-edged on the screen surface. Pilots inside the spherical surface get very good ergonomics as the distance between the pilot's eyes and the screen is almost constant, independently of the angle at which the pilot looks at the screen.

The third way is by projecting on faceted displays, as described for example in U.S. Pat. No. 5,179,440 which describes a rear projection facetted dome. The system screen is then made up by a number of flat or moderately curved facetted rear projected screens with a projector behind each screen facet. The advantage of this approach is that the projector resolution can be very well used to optimize the screen resolution, even with widescreen projectors and that the footprint can be kept small. The drawback is the visual ergonomics for the pilots are strongly compromised as the distance between the pilot's eyes and the screen is no longer constant, changes in a non-constant way at the facet edges and is dependent of the angle at which the pilot looks at the screen.

The fourth technique is a combination of the second and third techniques, i.e. by creating a hybrid rear projected solution that is a partly rear projected continuous surface and faceted surface. Again here, the wide screen projectors can be used efficiently and the footprint can be kept compact but the visual ergonomics for the pilots are strongly compromised for the same reasons as the faceted display.

U.S. Pat. No. 5,023,725 describes a method and an apparatus for dodecahedral imaging system. U.S. Pat. No. 9,188,850 provides a Display System for high Definition projectors. WO2012/040797 discloses a Curved Back projection Screen. US20120218170 discloses a Method and Apparatus for a Wide Field of View Display, US2007/0009862 provides a Simulator using a non-spherical projection surface and U.S. Pat. No. 9,110,358 proposes a method for creating and a system for a constant vertical resolution toroidal display.

SUMMARY OF THE INVENTION

Embodiments including systems, devices and methods described herein concern a non-spherical projection display structure and system and display method that can be optimized for the ergonomics of preferably one viewer inside the display structure or system. The structure or system or method is preferably for use with widescreen projectors. The present application is aimed at creating a visual projection display and method of operating the display that has a wide horizontal and vertical field of view and uses a rear projected display structure having a projection screen surface with a thickness.

According to an aspect of the present invention, there is provided a visual system comprising a non-spherical dome display screen wherein a non-spherical shape of the screen is such that it comprises an axis of revolution preferably perpendicular to a horizontal plane and substantially forms a surface of revolution around said axis of revolution and has a thickness, said surface of revolution being formed by the rotation around the axis of revolution of a planar curve, each point on the planar curve being defined by an angle and a radius, the plane curve having at least one section where the radius of curvature increases or decrease monotonically with change of said angle.

In the visual system comprising a non-spherical dome screen the shape of the screen can be such that it comprises an axis of revolution preferably perpendicular to a horizontal plane and substantially forms a surface of revolution around said axis of revolution and has a thickness, said surface of revolution being formed by the rotation around the axis of revolution of a planar curve having a minimum radius of curvature R1 and a maximum radius of curvature R2 where R2 differs from R1 and where the non-spherical screen shape has been optimized for the viewer's ergonomics by integrating the radius of curvature of the screen surface through the formulas $$\frac{\partial R}{\partial \Phi} = C_2 \pm e(\phi, \theta) \text{ and } \frac{\partial R}{\partial \theta} = C_1 \pm e(\phi, \theta)$$

where $C_1$ and $C_2$ are constants and $e(\phi,\theta)$ is a variable tolerance factor on these constants that is in absolute values smaller than both $C_1$ and $C_2$ for all $\theta$ and $\phi$ values and where $\theta$ is the angle of the screen point P in the horizontal plane and $\phi$ is the zenith angle.

The non-spherical shape of the screen can be optimized for the viewer's ergonomics by a simplified integration of the radius of curvature of the screen surface through the formulas $$\frac{\partial R}{\partial \Phi} = C_2 \pm e \text{ and } \frac{\partial R}{\partial \theta} = C_1 \pm e$$

where $C_1$, $C_2$ and $e$ are constants and $\theta$ is the angle of the screen point P in the horizontal plane and $\varphi$ is the zenith angle.

The non-spherical shape of the screen can have a first arc and a second arc with respectively a first and second radius of curvature R1 and R2, wherein the first arc is located in the upper part of the screen and the second arc is located in the lower part of the screen, and is such that R1<R2.

The screen can be surrounded by at least a first group of projectors configured to display images for a user located inside the non-spherical dome screen, wherein the first group of projectors comprises at least three projectors arranged around the periphery of the screen in a horizontal plane so as to provide a combined image having a horizontal field of view of at least 180° and a vertical field of view in the range of at least 20° downward to 60° upward.

A second group of projectors can be provided, wherein the second group of projectors comprises at least one projector configured to illuminate the upper part of the screen, and provides an additional vertical field of view up to 90° being the zenith.

The variation of the radius of curvature along the azimuthal angle can be given by $$\frac{\partial R}{\partial \theta} = C_1 \pm e \text{ or } \pm e(\phi, \theta)$$

wherein $C_1$ is a constant in the range of 0% to 2.5% of the radius R2 per degree and is $e$ is a constant tolerance factor or $e(\phi,\theta)$ a variable tolerance factor on these constants with an absolute value of $e$ or $(\phi,\theta)$ preferably less than 2% of R2 per degree.

For example the first group of projectors can comprise at most nine projectors. The second group of projectors can comprise at most four projectors.

Mirrors associated to the first and/or second group of projectors can be used to fold the light beam projected by the projectors.

The vertical field of view of the system can be at most of −50° downward and a full 90° upward with 2 layers of projectors.

The first group of projectors can be arranged so as to cover a horizontal field of view up to 360°.

$C_1$ is preferably as small as possible but can have a value different from zero determined by the space constraints of the location in which the system needs to be installed.

One layer of projectors can be provided with each projector covering between 40° and 90° horizontal field of view with between 4 and 9 projectors to cover the total horizontal field of view.

There can be two layers of projectors, one layer being around the periphery with each projector covering between 40° and 90° horizontal field of view and one layer of projectors on the zenith area can cover at least the screen part that has a zenith angle between 75° and 90°

The system can have but-matched projectors with a geometry but-matching accuracy of better than 10 arc minutes as seen from the center of the dome.

The images projected by the projectors can be overlapping and blended.

The shape of the screen can be such that it comprises an axis of revolution preferably perpendicular to a horizontal plane and substantially forms a solid of revolution around said axis of revolution having an angle of curvature greater than 180°, said solid of revolution having a minimum radius of curvature R1 and a maximum radius of curvature R2 where R2 differs from R1 and where the non-spherical screen shape has been optimized for the viewer's ergonomics, and the screen comprises a first layer and a second diffusing layer on the first layer, the second diffusing layer containing a light absorbing material and light diffusing particles, the second diffusing layer being adapted to have a value of the product of the absorption coefficient and thickness of between 0.1 and 5.

The second diffusing layer can be a synthetic resin layer and the light diffusing particles can be embedded in a resin material.

The second diffusing layer can be on the inner surface of the first layer.

The second diffusing layer can comprise multiple layers.

The second diffusing layer can comprise a mix of diffusing layers and light absorbing layers.

The second diffusing layer can comprise alternating diffusing layers and light absorbing layers.

The first layer can be a synthetic resin layer or is made of glass.

The gain for backscattering (Gr) can have a value Gr<0.1 for an angle >40°. The value of Gr can be <0.07 while $\gamma$>7 for example.

In another aspect the present invention provides a non-spherical dome screen for use in rear projection for a user located inside the dome screen, wherein the shape of the screen is such that it comprises an axis of revolution preferably perpendicular to a horizontal plane and substantially forms a solid of revolution around said axis of revolution having an angle of curvature greater than 180°, said solid of revolution having a minimum radius of curvature R1 and a maximum radius of curvature R2 where R2 differs from R1 and where the non-spherical screen shape has been optimized for the viewer's ergonomics, the screen comprises a first layer and a second diffusing layer on the first layer, the second diffusing layer containing a light absorbing material and light diffusing particles, the second diffusing layer being adapted to have a value of the product of the absorption coefficient and thickness of between 0.1 and 5.

The second diffusing layer can be a synthetic resin layer and the light diffusing particles can be embedded in a resin material.

The second diffusing layer can be on the inner surface of the first layer.

The second diffusing layer can comprise multiple layers.

The second diffusing layer can comprise a mix of diffusing layers and light absorbing layers.

The second diffusing layer can comprise alternating diffusing layers and light absorbing layers.

The first layer can be a synthetic resin layer or is made of glass.

The gain for backscattering (Gr) can have a value Gr<0.1 for an angle >40°. The value of Gr can be <0.07 while $\gamma$>7.

In another aspect of the present invention a method of operating a visual system comprising a non-spherical dome screen wherein the shape of the screen is such that it comprises an axis of revolution preferably perpendicular to a horizontal plane and substantially forms a surface of revolution around said axis of revolution and has a thickness, said surface of revolution having a minimum radius of curvature R1 and a maximum radius of curvature R2 where R2 differs from R1 and where the non-spherical screen shape has been optimized for the viewer's ergonomics:

configuring at least a first group of projectors to display images onto the screen for a user located inside the dome screen, back projecting images from the at least first group of projectors the at least first group of projectors comprising at least three projectors arranged around the periphery of the screen in a horizontal plane so as to provide a combined image having a horizontal field of view of at least 180° and a vertical field of view in the range of at least 20° downward to 60° upward.

The non-spherical dome display screen has a non-spherical shape of the screen such that it comprises an axis of revolution preferably perpendicular to a horizontal plane and substantially forms a surface of revolution around said axis of revolution and has a thickness, said surface of revolution being formed by the rotation around the axis of revolution of a planar curve, each point on the planar curve being defined by an angle and a radius, the plane curve having at least one section where the radius of curvature increases or decrease monotonically with change of said angle.

The non-spherical shape of the screen preferably has a minimum radius of curvature R1 and a maximum radius of curvature R2 where R2 differs from R1 and wherein the non-spherical shape of the screen has been optimized for the viewer's ergonomics by integrating the radius of curvature of the screen surface through the formulas $\partial R/\partial \Phi = C_2 \pm e(\phi, \theta)$ and $\partial R/\partial \theta = C_1 \pm e(\phi, \theta)$ where C1 and C2 are constants and $e(\phi,\theta)$ is a variable tolerance factor on these constants that is in absolute values smaller than C1 and C2 for all $\theta$ and $\phi$ values and where $\theta$ is the angle of the screen point P in the horizontal plane and $\phi$ is the zenith angle.

In a simplified embodiment the integration of the radius of curvature of the screen surface can be through the formulas $$\frac{\partial R}{\partial \Phi} = C_2 \pm e \text{ and } \frac{\partial R}{\partial \theta} = C_1 \pm e$$

where $C_1$, $C_2$ and e are constants and $\theta$ is the angle of the screen point P in the horizontal plane and $\phi$ is the zenith angle.

The variation of the radius of curvature along the planar curve is given by $$\frac{\partial R}{\partial \Phi} = C_2 \pm e \text{ or } \pm e(\phi, \theta)$$

wherein $C_2$ is a constant in the range of 0.5% and 5% of the radius R2 per degree and e or $e(\phi,\theta)$ is preferably less than 2% of R2 per degree.

The variation of the radius of curvature along the azimuthal angle can be given by $$\frac{\partial R}{\partial \theta} = C_1 \pm e \text{ or } \pm e(\phi, \theta)$$

wherein $C_1$ is a constant in the range of 0% to 2.5% of the radius R2 per degree and e or $e(\phi,\theta)$ is preferably less than 2% of R2 per degree.

The non-spherical shape of the screen can have a first arc and a second arc with respectively a first and second radius of curvature R1 and R2, wherein the first arc is located in the upper part of the screen and the second arc is located in the lower part of the screen, and is such that R1<R2.

The screen shape and its radius of curvature variation parameters $C_1$ and $C_2$ are preferably optimized to match wide screen projectors with an aspect ratio larger than 1.34.

The value of $C_2$ is preferably determined by comparing the resolution requirement of the system with the resolution of the projectors in one direction optionally along a short axis of the projector image and an overlap required between projectors.

The overlap requirement is preferably determined by the blending or edging technology that is being used, whereby both can determine how many projectors are needed in the first layer of the system.

The vertical field of view of the system that has to be covered with the first layer of projectors is determined.

Taking into account the aspect ratio of the widescreen projectors and the opening angle of the projectors towards the vertical field of view, a value for $C_2$ is determined that matches this aspect ratio and the opening angle with the required vertical field of view of the first layer of projectors.

If a zenith is being used in the visual system, $C_2$ is further refined in the zenith using the same method on the second layer of projectors until a value is reached that both satisfies the requirements for the entire field of view of the system.

The technical effects and advantages of embodiments of according to the present invention correspond mutatis mutandis to those of the corresponding embodiments of the method according to the present invention.

BRIEF DESCRIPTION OF THE DRAWINGS

These and other technical aspects and advantages of embodiments of the present invention will now be described in more detail with reference to the accompanying drawings, in which:

FIG. 9 illustrates backward scattering for normal incidence on an embodiment of the present invention.

FIGS. 10 and 11 show incident light flux of a collimated beam onto a screen as used in embodiments of the present invention.

FIG. 18 illustrates bulk scattering.

FIG. 19A illustrates bulk diffusion transmission (left) and FIG. 19B illustrates reflection (right).

FIG. 20A illustrates transmissive (left) and FIG. 20B illustrates reflective (right) screen gain.

FIGS. 21A and 21B illustrate sharpness loss due to bulk diffusion, where FIG. 21A indicates an ideal screen and FIG. 21B indicates a realistic screen.

FIGS. 25A-25D illustrate brightness uniformity for an observer, left in front of screen, FIG. 25A shows an RP screen with small HGA single projector, FIG. 25B shows an RP screen with large HGA single projector, FIG. 25C shows an RP screen with small HGA three projectors and FIG. 25D shows an RP screen with large HGA three projectors.

DETAILED DESCRIPTION OF INVENTION

Figure 1:
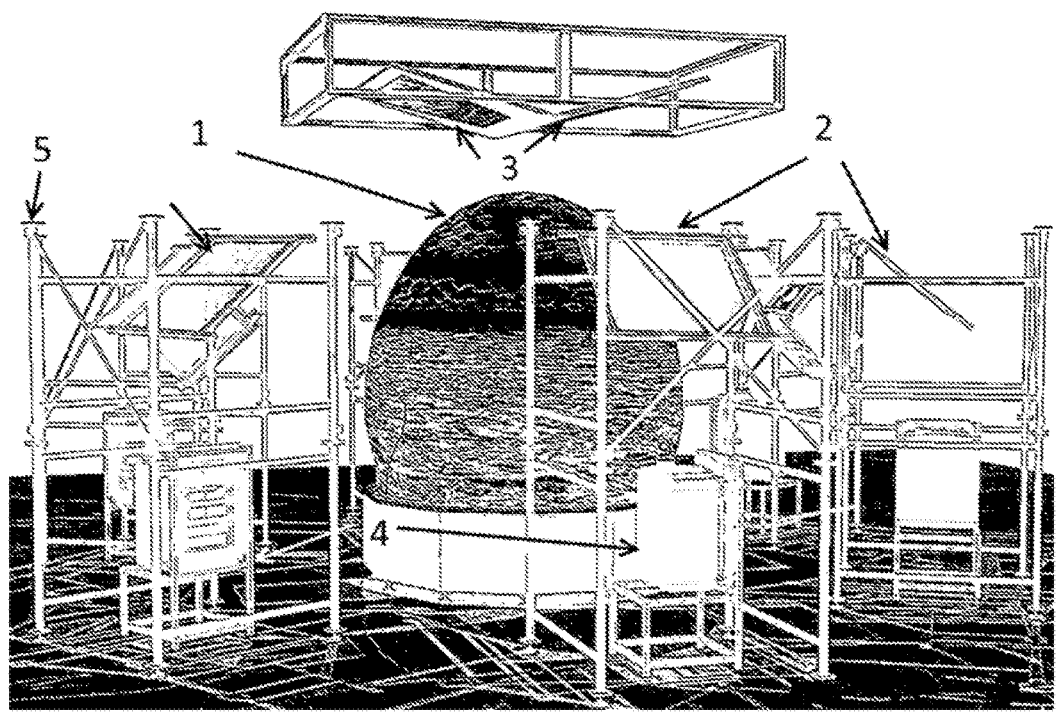
FIG. 1 shows a visual system with a horizontal field of view of 360° and a vertical field of view of +90° to −45° using a number of projectors on the ergonomic immersive non-spherical back projected screen, according to an embodiment of the present invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The present invention is directed at a rear projected non-spherical (or aspherical) screen 1 having a continuous shape, as illustrated for example in FIG. 1. The non-spherical screen 1 has an axis of revolution preferably perpendicular to a horizontal plane and substantially forms a surface of revolution around said axis of revolution and has a thickness. At least one viewer such as a pilot or driver will be placed inside the non-spherical (or aspherical) screen 1 to view images back projected onto the screen 1.

A plurality of back projection projectors 4, surround the outer surface of the screen 1. The plurality of projectors is configured to generate a plurality of images which combine in a single image on the screen such that when a user is inside the dome, i.e. the rear projected non-spherical screen, and in the horizontal plane, the user is surrounded by the generated image, which appears to the user as a perfectly smooth and continuous image.

In embodiments of the present invention, there can be two layers of projectors. The visual system according to embodiments of the present invention comprises at least a first layer or group of projectors 4 for back illuminating the periphery of the screen 1. Preferred embodiments of the present invention, comprise a second group of projectors 3 for illuminating the upper part, e.g. the zenith, of the screen 1.

The first layer of projectors 4 mounted on the structure 5 is located around the periphery of the screen 1 in a horizontal plane so as to cover the horizontal field of view, wherein each projector 4 can be coupled optionally to a mirror 2 so as to increase the projection distance and thus the footprint of the image, while minimizing the space required by the installation for example the distance between the projectors and the screen 1. The projected images of this first group of projectors cover a vertical field of view between −45° and 65°. If the shape of the screen 1 is close to a perfect surface of revolution, the position of each projector and each optional mirror with respect to the periphery of the screen can be identical, and the distance between two consecutive projectors and optionally mirrors can also be identical. More complex configurations can be foreseen for screens 1 whose shape is not a perfect surface of revolution. The shape of the screen is discussed further below.

The second layer of projectors can be coupled optionally to a plurality of mirrors 3 so as to project images which cover the zenith of the non-spherical screen 1. The number of projectors and optionally mirrors 5 for the second group is preferably at least 1, more preferably 2. However, a configuration with more than 2 projectors, for example 4 is within the scope of the present invention. As for the first layer of projectors, increasing the number of projectors improves the resolution obtained. Thus, the selection of the number of projectors and optionally mirrors depends on the application and the requirements of that application. The field of view of the second layer of projectors is comprised in the range of 65° to 90°.

In embodiments of the present invention, the projectors can directly project onto the rear projected screen. However, such a system would increase the space required between the projectors and the screens.

Figure 4:
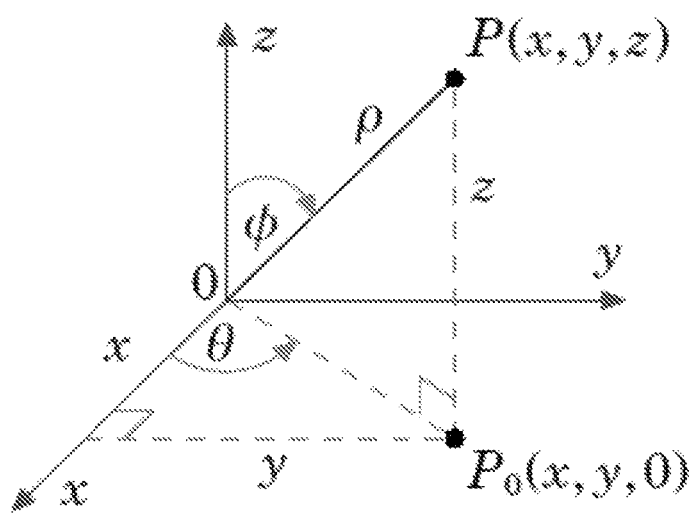
FIG. 4 shows a spherical co-ordinate system where $\theta$ is the angle of the screen point P in the horizontal plane, referenced to the x-axis and $\phi$ is the zenith angle of screen point P versus the z-axis.

FIG. 4 shows the coordinate system used to describe the shape of the screen 1 according to embodiments of the present invention. The spherical coordinate system is used. The coordinates of point P can be described by the radial distance ρ of a point from a fixed origin, its polar angle φ or zenith angle measured from a fixed zenith direction or z axis, and the azimuth angle θ of its orthogonal projection on a reference plane defined by horizontal axis x, y that passes through the origin O and is orthogonal to the zenith or z axis, measured from a fixed reference direction on that plane.

Figure 2A:
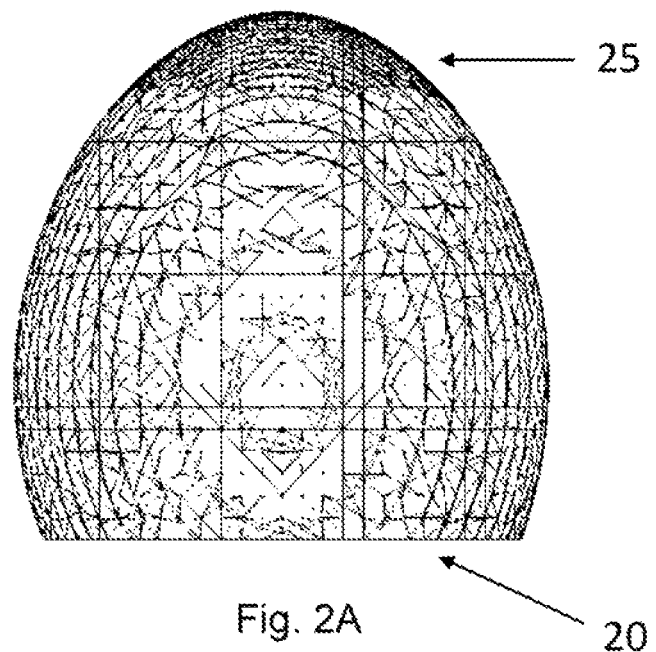
FIG. 2A shows a side view of an ergonomic immersive non-spherical back projected screen according to an embodiment of the present invention.
Figure 2B:
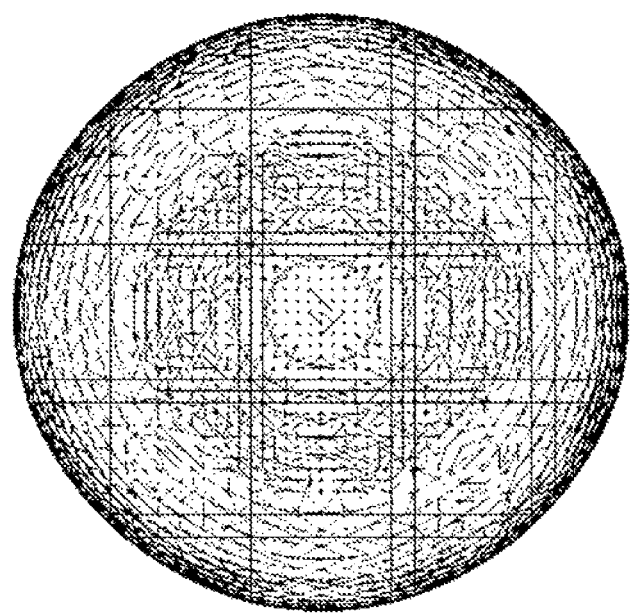
FIG. 2B shows a top view of an ergonomic immersive non-spherical back projected screen according an embodiment of to the present invention.

As shown in FIGS. 2A-2B, the shape of the screen 1 can be described in various planes. In embodiments of the present invention, the shape can be different in the y, z plane, x, y plane and x, z plane, as is the case for example for an ellipsoid. As shown in FIG. 2A, the base of the screen 1 can be a plane which truncates a surface of rotation and forms an opening 20. This opening 20 allows a user to enter into the screen. Usually the floor of a transport vehicle such as a ship, automobile, airplane etc. is not transparent and hence the floor of the screen 1 can be opaque.

The shape of the screen according to the present invention is non-spherical in at least one vertical plane, i.e. the x, z plane or the y, z plane. In said plane, the shape of the screen can be described by a plane curve having a radial distance ρ with respect to the origin. A condition for the shape to be non-spherical in at least one vertical plane is for the plane curve to have a non-constant radius of curvature, or in other words, have said radial distance ρ not constant. For a sphere the radius of curvature does not change but remains constant. Embodiments of the present invention make use of a surface a part of which has a radius of curvature that increases as an angle changes. Preferably the radius of curvature increases or decreases monotonically. One aspect of embodiments of the present invention is to use a surface that is part of a spiral.

The radius of curvature R of the plane curve is generally defined as the absolute value of $$R = \left|\frac{ds}{d\varphi}\right| = \frac{1}{\kappa}$$

wherein s is an arc length from a fixed point on the curve, φ is the tangential angle at the point in the direction of the curve and κ is the curvature.

The shape of the screen 1 according to the present invention has preferably been optimized to improve the ergonomics for the viewer. This has been realized, for example, by optimizing the variation of the radius of curvature R at least along the zenith angle Φ. Embodiments of the present invention make use of a surface a part of which has a radius of curvature that increases as angle Φ changes. Preferably the radius of curvature increases or decreases monotonically. One aspect of embodiments of the present invention is to use a surface that is part of a spiral. The variation of the radius of curvature R can also be optimized along the azimuthal angle θ. Embodiments of the present invention make use of a surface a part of which has a radius of curvature that increases as angle Φ changes. Preferably the radius of curvature increases or decreases monotonically. One aspect of embodiments of the present invention is to use a surface that is part of a spiral.

Figure 3:
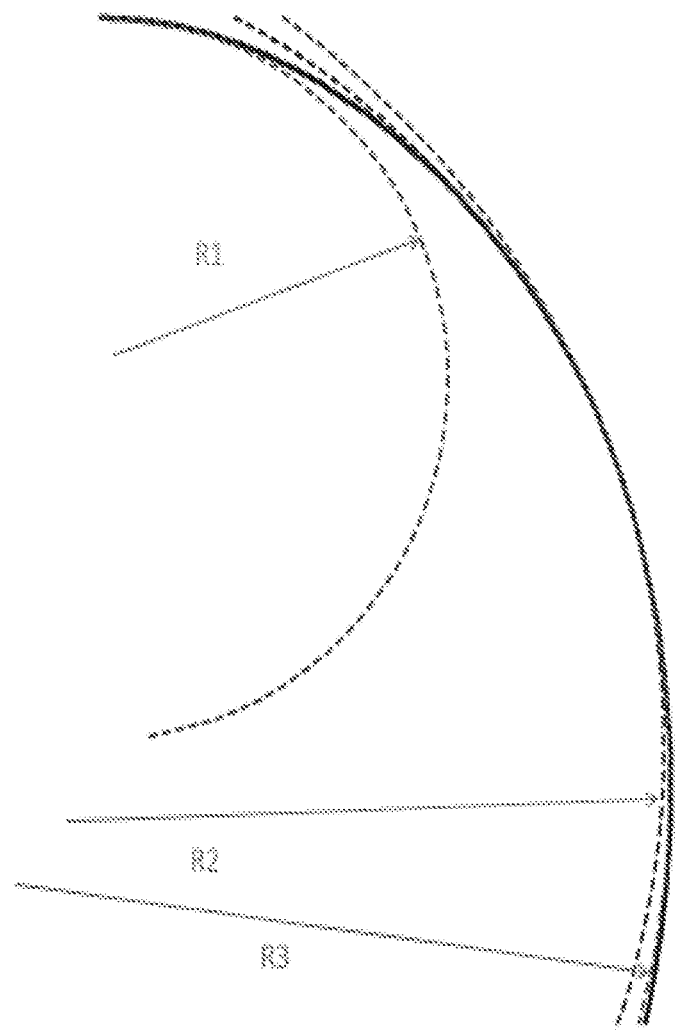
FIG. 3 shows a vertical cut through an embodiment of the present invention having an ergonomic immersive non-spherical back projected screen (side view) showing the radius of curvature R1, R2 and R3 at 3 different corresponding zenith angles.

FIG. 3 shows a plane curve according to an embodiment of the present invention. It also shows the radius of curvature of 3 distinct locations of the plane curve to demonstrate that the radius of curvature varies along the plane curve. At the top, a small radius of curvature $R_1$ for the higher arc is preferred as it reduces the number of projectors 4 along the periphery and at the zenith with respect to a screen having a spheroidal shape.

When R is not constant and varies from a maximum radius $R_3$ to a minimum radius $R_1$, it is preferred to keep this variation as small as possible along the plane curve. A preferred way to achieve this is to keep the variation sufficiently close to a constant at least along the zenith angle Φ. It can also be held constant along the azimuthal direction. This allows to provide good viewer ergonomics. This can be mathematically expressed as a monotonically increasing or decreasing radius of curvature. Such a curve can be part of a spiral. This can be mathematically expressed, for example as the radius of curvature of the screen surface being define by the formulas $$\frac{\partial R}{\partial \Phi} = C_2 \pm e(\phi, \theta) \text{ and } \frac{\partial R}{\partial \theta} = C_1 \pm e(\phi, \theta)$$

where $C_1$ and $C_2$ are constants and $e(\phi,\theta)$ is a variable tolerance factor on these constants that is in absolute values smaller than $C_1$ and $C_2$ for all θ and φ values and where θ is the angle of the screen point P in the horizontal plane and φ is the zenith angle.

In a simplified embodiment the integration of the radius of curvature of the screen surface can be through the formulas $$\frac{\partial R}{\partial \Phi} = C_2 \pm e \text{ and } \frac{\partial R}{\partial \theta} = C_1 \pm e$$

where $C_1$, $C_2$ and e are constants and θ is the angle of the screen point P in the horizontal plane and φ is the zenith angle.

The variation of the radius of curvature along the planar curve can be given by $$\frac{\partial R}{\partial \Phi} = C_2 \pm e \text{ or } \pm e(\phi, \theta)$$

wherein $C_2$ is a constant in the range of 0.5% and 5% of the radius R2 per degree and e or $e(\phi,\theta)$ have an absolute value that is preferably less than 2% of R2 per degree.

The variation of the radius of curvature along the azimuthal angle can be given by $$\frac{\partial R}{\partial \theta} = C_1 \pm e \text{ or } \pm e(\phi, \theta)$$

wherein $C_1$ is a constant in the range of 0% to 2.5% of the radius R2 per degree and e or $e(\phi,\theta)$ have an absolute value that is preferably less than 2% of R2 per degree.

With respect to the tolerance e or $e(\phi,\theta)$ it is important that the absolute value of this tolerance e or $e(\phi,\theta)$ remains less than 2% of $R_1$ per degree. Making $C_1$ 0% means that the surface is spherical in a horizontal plane.

With these constants and this tolerance, the viewer sees a continuous surface having smooth variations unlike systems of the prior art, such as faceted systems or hybrid rear projected systems where the viewer is looking at a screen where the radius of curvature has a strong variation along the θ and Φ angles.

The value of $C_2$ can be optimized to create a shape that matches the aspect ratio of wide screen projectors (whose projected image has a long and a short dimension) and to utilize the wide screen projectors' pixels and brightness as efficiently as possible. The value of $C_2$ is determined by looking at the resolution requirement of the system, comparing this with the resolution of the projectors in one direction (typically along the short axis of the projector image) and the overlap required between projectors. This overlap requirement is determined by the blending or edging technology that is being used. From this the number of projectors that are needed can be determined for the first layer of the system. Subsequently, the vertical field of view of the system is determined so that it is covered with the first layer of projectors (typically along the long axis of the projectors). Taking into account the aspect ratio of the widescreen projectors and the opening angle of the projectors towards the vertical field of view, a value for $C_2$ is determined that matches this aspect ratio and the opening angle with the required vertical field of view of the first layer of projectors. If a zenith is being used in the visual system, $C_2$ is further refined in the zenith using the same method on the second layer of projectors until a value is reached that both satisfies the requirements for the entire field of view of the system. $C_1$ is preferably as small as possible but can have a value different from zero to match with space constraint of the location in which the system needs to be installed. Widescreen projectors which are preferably used with embodiments of the present invention have an aspect ratio of more than 1.34, the aspect ratio being defined as the ratio between the width of the longest axis of the rectangular projected image and the width of shortest axis of the rectangular projected image.

FIGS. 2A and 2B show an embodiment of the present invention wherein the shape of the screen is a surface of revolution having the z axis as the axis of revolution and the screen has a thickness. The surface can be mathematically expressed as a monotonically increasing or decreasing radius of curvature. Such a curve can be part of a spiral. Thus, the plane curve is described by integrating the formula $$\frac{\partial R}{\partial \Phi} = C_2 \pm e(\phi, \theta)$$

between the upper vertical field of view and the lower vertical field of view. The integration constant is determined by the minimum eye relief from the design eye point inside the system to the screen. In the embodiment shown in FIG. 3, the radii of curvature are shown on three different locations to show how the radius of curvature varies along the curve. The top view of the screen shown in FIG. 2B is thus a circle.

The shape of a surface of revolution can be described by a plane curve, or a profile function of $\rho$ and $\varphi$ whereby this can be mathematically expressed as a monotonically increasing or decreasing radius of curvature. Such a curve can be part of a spiral. The surface is obtained by rotating said plane curve around the axis of revolution, or the z axis. The screen has this surface and a thickness.

In other embodiments of the present invention, the shape of the screen 1 can be an ellipsoid having three pairwise perpendicular axes of symmetry which intersect at a center of symmetry, or can be a mixture between an ellipsoid and a solid of revolution.

In a preferred embodiment of the present invention, as described in reference to FIGS. 2A, 2B, and 3, the shape of the screen is an ovoid, the characteristics of an ovoid being that the planar curve is a function of the radius and the angle $\varphi$. This can be mathematically expressed as a monotonically increasing or decreasing radius of curvature. Such a curve can be part of a spiral.

The first layer or group of projectors 2 around the periphery can comprise between 4 and 9 projectors and the layer or group of projectors 3 on the zenith can comprise between 1 and 4 projectors. The number of projectors depends upon the resolution and brightness required by the application. The images projected by the projectors can be overlapping in which case they are blended or can be matched with an accuracy of better than 10 arc minutes as seen from the center of the dome. Thus, the combined images appear as a single smooth and continuous image to the user.

In the drawings of FIGS. 2B and 3 a curve is depicted that has a radius of curvature R1 at the zenith of around 1 m and a $C_1=0$ and $C_2=2\%$. All other radii of curvature along the surface are determined by these values. This allows to create a system with 8 projectors that has similar characteristics in brightness and resolution as a spherical system with radius 1.7 m and 13 identical projectors while maintaining excellent display ergonomics from the pilot's or driver's eye point.

It should be noted that the mirrors can be oriented in any direction and their orientation is purely determined to make the footprint of the system as small as possible.

An aspect of embodiments of the present invention is the material from which the screen is made. In fact, as the screen operates in back projection, a diffusing screen is preferred. Although diffusing flat back projection screens are known, these are not so easily adapted for the shape described in the present invention. One problem with viewing inside a dome is that light from one side of the screen will impinge on the other. This differs from the flat screen for which the only light projected onto the screen is that from ambient light sources and that can be reduced by suitable shading within the enclosure where the simulator is located. But for the screen according to the present invention, it is the image itself on one side of the screen which becomes the ambient light for the image on the other side. This affects the contrast that can be obtained and renders materials suitable for flat screens to be not suitable for spherical screens if the same levels of contrast are to be achieved. Such a problem has been discussed in the patent application WO2012/040797 which discloses a spherical Curved Back Projection Screen, and the content of which is incorporated hereby by reference.

Figure 17:
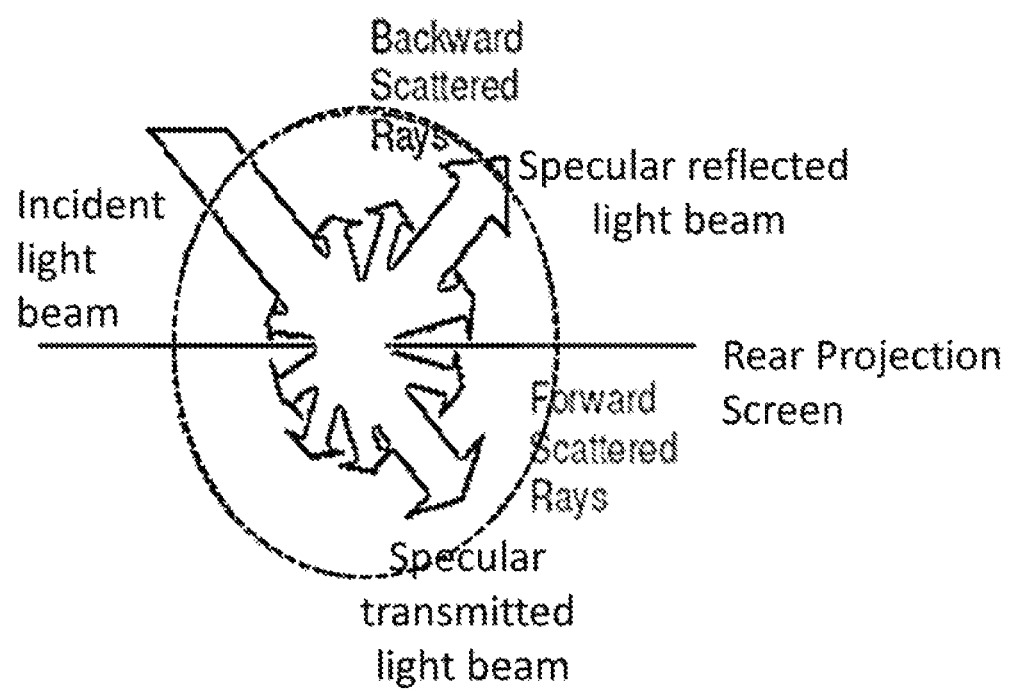
FIG. 17 illustrates forward and backward scattering.

A rear projection (RP) screen scatters incoming light from the projectors in different directions (FIG. 17). The light scattering can be split up into forward scattering and backward scattering. Backward scattered rays are lying on the same side of the screen as the incoming light, forward scattered rays are lying on the opposite side. For rear projection screens the light that is scattered in the forward direction is useful light as it will be viewed. Backscattered light is loss and should be minimized. The backscatter pattern of the light rays can be characterized by the bidirectional reflectance distribution function (BRDF), the forward scattered pattern by the bidirectional transmittance function (BTDF). These functions contain as parameters the direction of the incoming and outgoing light ray. Rear projection screens are often characterized by a simpler function, the screen gain. The screen gain is defined by the ratio of the luminance of the screen to the luminance of an ideal, zero absorption Lambertian screen. The luminance of an ideal, zero absorption Lambertian screen is defined by $$L = \frac{E}{\pi}$$

In which E is the illuminance of the backside of the screen and L is the luminance seen by an observer in front of the screen. In general, the luminance of an ideal Lambertian screen only depends on the illumination of the screen surface.

Bulk diffusion rear projection screens make use of bulk scattering (FIG. 18) to scatter incoming light in different directions. These screens are often circular symmetric, i.e. the brightness depends only on the angle between observation direction and specular direction (FIGS. 19A-B):

$$\text{gain}(\theta) = \frac{\pi \cdot L(\theta)}{E}$$

In that case, the gain characteristics of the rear projection screen can be represented by two 2-dimensional graphs (FIGS. 20A-B). The gain at zero angle is called peak gain, the angle for which the gain is half of the peak gain is called the half gain angle (=HGA).

The optical properties of a bulk diffusion screen are important. One straightforward way to realize a RP screen is by adding barium sulfate, aluminum oxide, zinc oxide, magnesium carbonate, calcium carbonate, calcium sulfate, sodium silicate, clay, chalk, etc. to a clear bulk material, for instance polyester, polycarbonate or PMMA. The weight percentage of this addition is in the range of 20%. By adding these minerals, cavities are introduced causing the material to look opaque. The quality of such a RP screen will be very poor. A lot of light is backscattered and/or ends up in neighbouring pixels, thus destroying sharpness and contrast (FIGS. 21A-B). This will be referred to as pixel cross-talk. Besides this the transmissive gain will be poor and the screen will appear milky.

Figure 22:
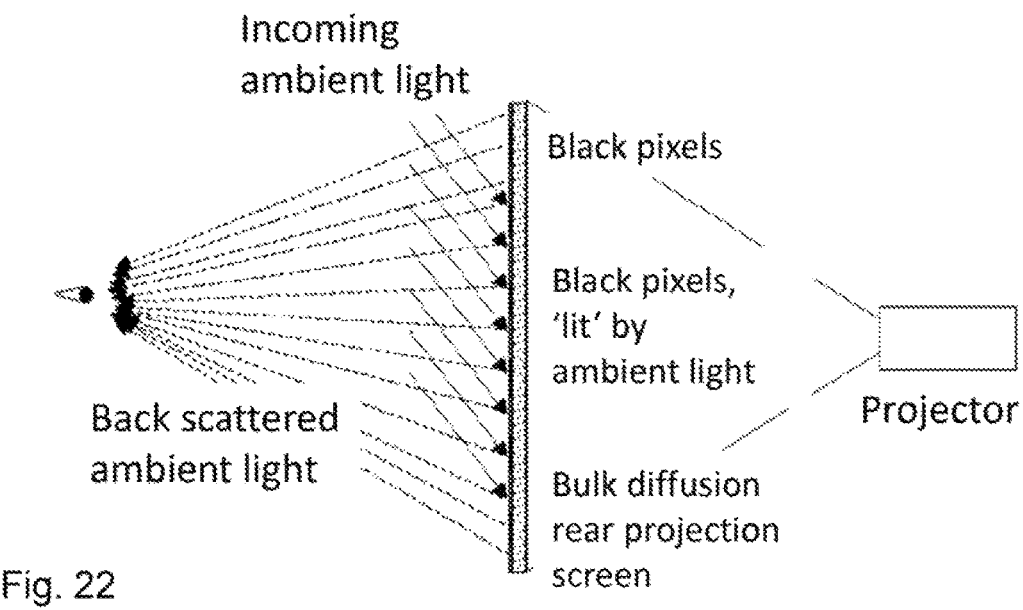
FIG. 22 illustrates contrast decrease due to ambient light.

Even with a well-defined bulk diffusion screen that has low pixel cross-talk one may end up with a low contrast. If the screen is put in an environment with a lot of ambient light, this ambient light may destroy the contrast. Each pixel, including the dark ones, is illuminated by ambient light, and backscatters light partly in direction of the observer (FIG. 22). Therefore, the dark pixel is perceived brighter than without ambient light. i.e. the contrast ratio of the image is decreased.

If we assume a Lambertian screen, the contrast ratio can be written as $$CR = \frac{(E_{bright} \cdot g_{trans} + E_{amb} \cdot g_{refl})/\pi}{(E_{dark} \cdot g_{trans} + E_{amb} \cdot g_{refl})/\pi}$$

If we now assume that the dark illumination E_dark is very low, we end up with $$CR = \frac{E_{bright} \cdot g_{trans} + E_{amb} \cdot g_{refl}}{E_{amb} \cdot g_{refl}}$$

From this equation it is clear that there are two ways to increase the contrast, first of all by decreasing the ambient illumination and secondly by introducing an unbalance in the transmissive/reflective gain characteristics ($g_{trans} \gg g_{refl}$).

Figure 23:
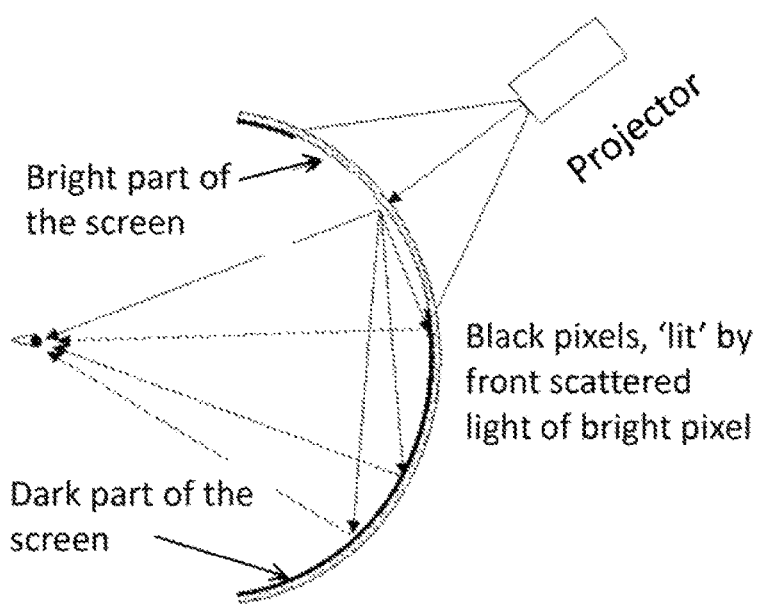
FIG. 23 illustrates contrast decrease due to back reflection of front scattered light.

In case of a curved screen part of the forward scattered light ends up in dark pixels where it is back scattered in all directions, including the observer direction (FIG. 23). So also in this case contrast ratio is decreased. From the equation above it is clear that for a given ambient illumination condition, introducing an unbalance in the transmissive/reflective gain characteristics ($g_{trans} \gg g_{refl}$) will lead to a higher contrast ratio.

The above reasoning also holds for the case where a non-Lambertian screen is considered.

Figure 24:
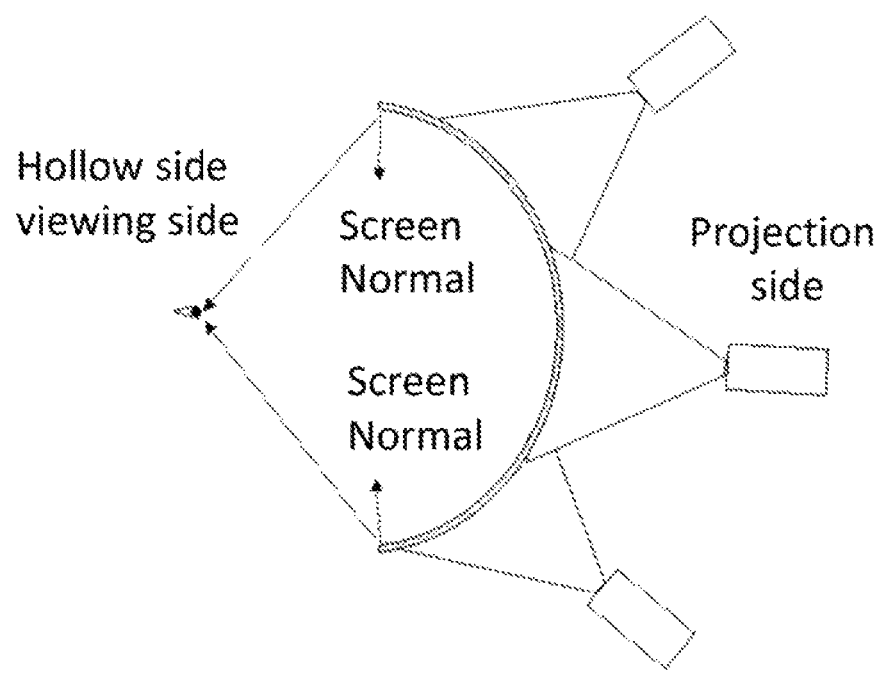
FIG. 24 illustrates back projection onto a substantially curved screen as used in embodiments of the present invention.

In accordance with embodiments of the present invention the optical properties of a diffusive coating have been optimized. A screen including the coating is suited for rear projection screens that are substantially curved, e.g. have an angle of curvature of 180° or more. Curved also includes a polygonal curvature, e.g. similar to the simulator screen of the windows of a ship's bridge. The viewing side of the screen is the hollow side, the projection side is the convex side in a back-projection arrangement (FIG. 24). By substantially curved we refer to screens that contain at the viewing side at least two screen normals that are substantially opposite to each other. In other words there exist at least 2 screen normals that make an angle close to 180°. For such screens there is at least one region that receives forward scattered light coming from the screen in the opposite direction (see FIG. 23). From the above it can be derived there is a need to create an unbalance between transmissive and reflective gain characteristics in order to end up with a good contrast ratio.

A second requirement of a bulk diffusive screen coating is the transmissive half gain angle, which should be as large as possible (see FIGS. 20A-B). Both for multi-viewer applications and applications where the observer head moves this is necessary. If the HGA would be very small, the screen would be very directive. This implies that without electronic or optical compensation (i.e. illuminance on the backside of the screen does not depend on the screen position) the brightness uniformity of the screen would be very poor (see FIGS. 25A-D). Electronic or optical compensation may uniformize the brightness but this only goes for one observer.

Besides these requirements, there are other requirements as for instance image sharpness and speckle.

In accordance with embodiments of the present invention the parameters that determine the forward and backward scattering properties of the coating are:
the light diffusing particles included within the diffusing layer, the medium that contains these particles and the absorber dyes, pigments or other materials that are used for light absorption. The light diffusing particles are characterized by their shape, size, refractive index and concentration. The medium that contains the particles is characterized by its refractive index and thickness. This medium should be very stable in time, no discoloration over time may occur. The absorber materials such as pigments are characterized by their stability, concentration and should be color neutral.

By adjusting all parameters that influence the optical parameters of the diffusive coating a parameter combination can be found that results in a high resolution, high contrast ratio, high brightness, high half-gain-angle, speckle free diffusive coating. The asymmetry achieved can be characterized by a forward scattering peak gain that is larger than 0.25, a forward scattering half-gain-angle that is larger than 45° and more preferably greater than 55° and less than 80° or 70° and a backward scattering gain that is smaller than 0.20 for angles larger than 15° and smaller than 0.10 for angles larger than 30°.

In one embodiment, the present invention relates to a curved screen especially a domed screen. A domed screen according to the present invention is an aspherical rear projection screen as previously described. For example, the viewing space inside the dome according to the present invention can have a field of view theoretically of $0 \leq \theta \leq 2\pi$ and $0 \leq \phi \leq \pi$ (usual spherical co-ordinates $(r,\theta,\phi)$ with origin in the center of the sphere), as described in reference to FIG. 4. The dome can have one section cut away (truncated) to provide an opening 20 at the bottom. This can be used for access or a separate opening 25 can be provided for access. In this case, the field of view can be $0 \leq \theta \leq 2\pi$ and $0 \leq \phi < \pi$ (usual spherical co-ordinates $(r,\theta,\phi)$ with origin in the center of the sphere). However, embodiments of the present invention also find advantageous use with a curved screen with a field of view can be $0 \leq \theta \leq \pi$ and $0 \leq \phi < \pi$ Such a screen can be used in a simulator of a ship's bridge for example, as the view out of the windows of the bridge can be limited, e.g. the roof prevents a view out in the vertical direction. Another example is a half-dome screen where the viewer only faces forwards. In this case the field of view can be $0 \leq \theta \leq \pi$ and $0 \leq \phi < \pi$ (usual spherical co-ordinates (r,θ, φ) with origin in the center of the sphere).

The aspherical screen or dome comprises an optically transparent structure with mechanical characteristics and dimensions that guarantee a stable mechanical structure. One surface, typically the inside surface of the curved screen, e.g. the dome has an inner-layer with the required diffusing optical characteristics. A good balance of the characteristics: high contrast ratio, high resolution (MTF-value), freedom from artifacts and large viewing angle are usually required. Several projectors are located outside the aspherical screen and the image from these projectors is formed on the inner-layer. MTF stands for Modulation Transfer Function and is used to characterize how well an optical system can resolve black and white images. This is linked to the eye limiting properties of the dome. For example in a dome used for flight simulation it is important to have so much resolution that a pilot can see a simulated plane from several kilometers—i.e. the simulator has a resolution that matches the actual limit for 20/20 eyesight. See https://en.wikipedia.org/wiki/Optical_transfer_function Without being limited by theory the following optical characteristics are preferred for a good image formation on the inner-layer:

For an ideal projection screen the luminance is independent of the viewing angle (Lambertian emitter: $L(\theta')$ =constant=L0). The gain g of the screen is defined as the luminance of the screen in the forward direction with respect to the luminance of an ideal Lambertian reflectance standard with 100% reflectance. Although in some applications the observation volume (eye-box of the viewer) is limited it is preferred to approximate a Lambertian emitter because also a good blending is required in the overlap region of the images from different projectors.

The level of the luminance is preferably higher than a certain minimum level for good visibility. The luminance level is function of the light flux produced by the projector, the area of the image and the optical characteristics of the inner-layer.

For good image reproduction, the contrast ratio of the image viewed inside the aspherical screen is preferably higher than a certain minimum level. The contrast ratio is usually measured using a checkerboard pattern. Light scattered from illuminated parts of the screen will illuminate the dark parts of the image (cross-talk and integration effect) and consequently reduce the contrast ratio. The inner-layer of the aspherical screen should minimize the influence of the scattered light that illuminates the dark parts of the image. The backscattering characteristics of the inner-layer reduce the influence of the cross-talk on the contrast ratio.

The inner-layer most preferably conserve the resolution of the image. Due to scattering of light in the inner-layer a blurring effect on the image of the pixels is possible. This can be expressed as the impulse response or an MTF-value can quantify this effect. The MTF-reduction due to the screen should be minimal.

The inner-layer preferably does not produce speckle noise. Speckle noise is a granular pattern superimposed on the displayed image and is a consequence of the spatial and temporal coherence of light. Wavelets scattered by surface roughness or scattering particles can interfere at the observation point and generate a granular pattern.

Forward Scattering

Figure 5:
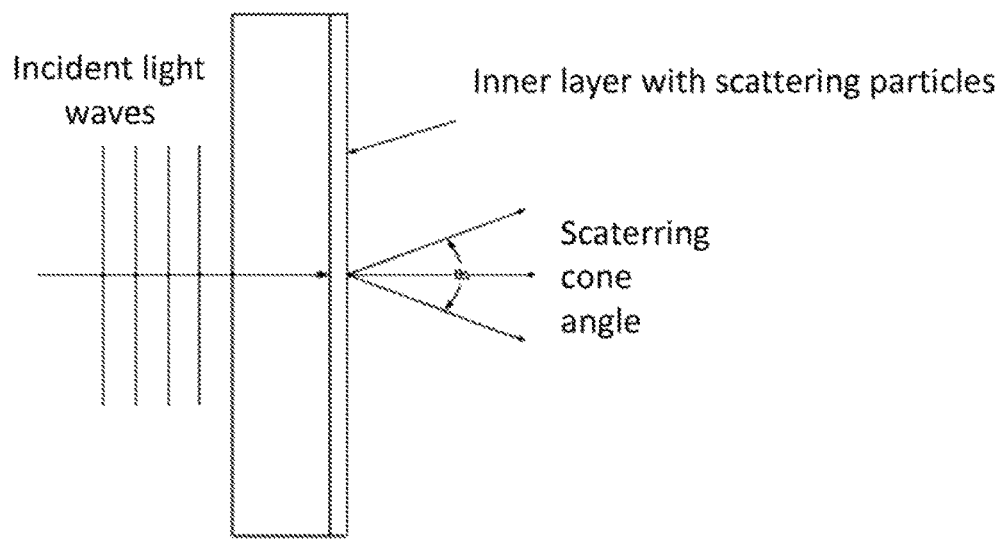
FIG. 5 illustrates forward scattering of light with a bilayer screen for use with any embodiment according to the present invention.

Forward scattering of light (see FIG. 5) can be caused by surface diffusion, holographic diffusion or bulk diffusion. Bulk diffusion is realized by scattering particles (also called light-diffusing particles) in the bulk of the inner-layer, in this case the scattering particles, with refractive index n1, are distributed in a material such as a resin or glass with refractive index n2. The particles are preferably spherical in shape but they could have other shapes such as spheroidal, potato-shaped, cylindrical, ellipsoidal, oval, etc. In the case of bulk scattering the scattering cone angle $\theta_s$ depends on $\Delta n = n1 - n2$, the average diameter d of the scattering spherical particles, the weight concentration c of the scattering particles and the thickness t of the inner-layer:

$$\theta_s \propto \frac{\Delta n \cdot t \cdot c}{\ln(d)}$$

diffuser is characterized by an amplitude transmittance $|d(x,y)|$, this is a random variable. The autocorrelation function R(x,y) of the diffuser's amplitude transmission is for many types of diffusers given by: $R(x, y) = \exp[-\pi \cdot (x^2 + y^2)/L^2]$; L is the correlation length of the diffuser. The scattering angle $\theta_s$ of the diffuser is related to the correlation length:

$$\sin\left(\frac{\theta_s}{2}\right) = \frac{\lambda}{2 \cdot L}$$

Figure 6:
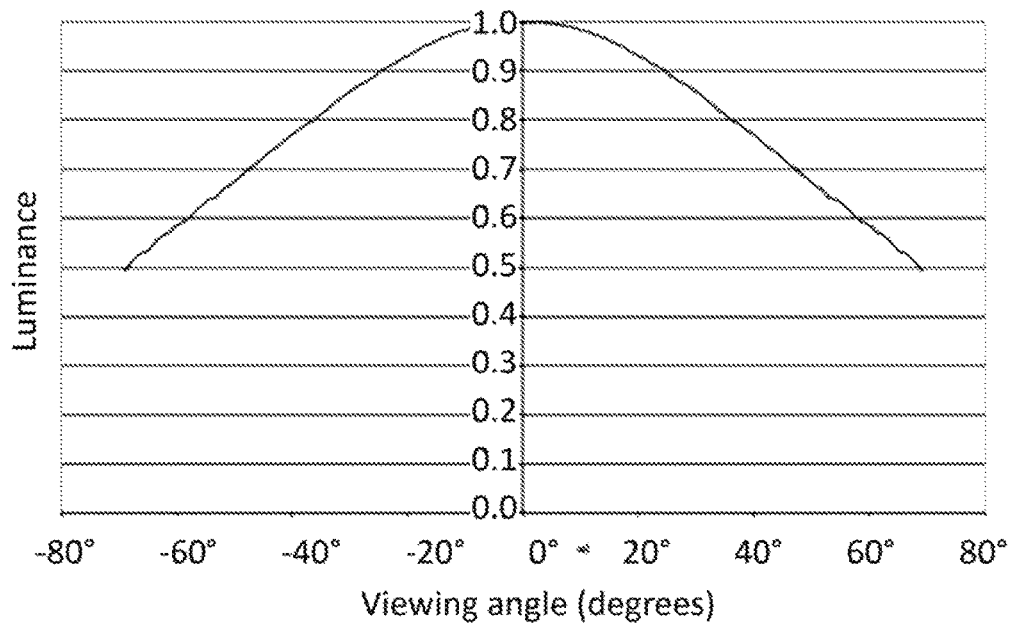
FIG. 6 shows the luminance as a function of viewing angle obtained in accordance with an embodiment-of the present invention.

The bulk diffuser is designed to provide the desired luminance distribution $L(\theta_v)$. In a practical realization, FIG. 6 shows the luminance as a function of the viewing angle $\theta_v$ obtained in accordance with an embodiment of the present invention.

An ideal Lambertian emitter would have a luminance that is constant for $-\pi/2 \leq \theta_v \leq \pi/2$. An important characteristic is the angle for which the luminance is at 50% of the maximum luminance level, called the "half-gain angle". In this embodiment, the half-gain angle is approximately 70°≈1.22 rad. The measured 0° luminance value was approximately 74 cd/m². In this case, the 0° luminance of an ideal Lambertian emitter is 191 cd/m². The screen gain g at 0° (called "screen peak gain") is in this case 0.38.

An important drawback of the diffusion by the scattering particles is usually the increased blurriness of the image by increasing the scattering cone angle.

Backward Scattering

Figure 7:
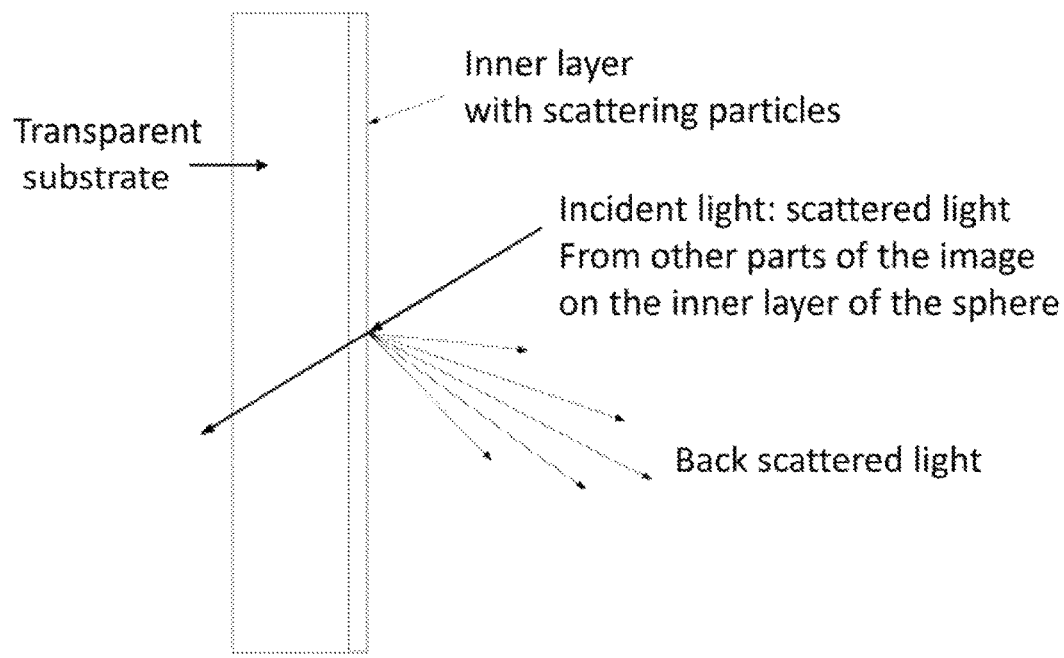
FIG. 7 shows how incident light from other parts of a screen affect contrast.

Incident light from other parts of the image inside the dome (FIG. 7) reduce the contrast ratio. In order to minimize this contrast reduction, the reflection and the backward scattering should be reduced as much as possible. This is realized by adding a light absorbing material in the inner layer, such as a dark or black material of which a dye or pigment or tint are examples, with a weight concentration $c_{dye}$ to the inner-layer. The inner-layer also contains a light scattering particles with a refractive index n1. The refractive index of the light scattering particles is smaller than the refractive index n2 of the resin, n1<n2. The black dye will result in a reflection coefficient ρ<1 and a light absorption coefficient α (units m⁻¹).

Figure 8:
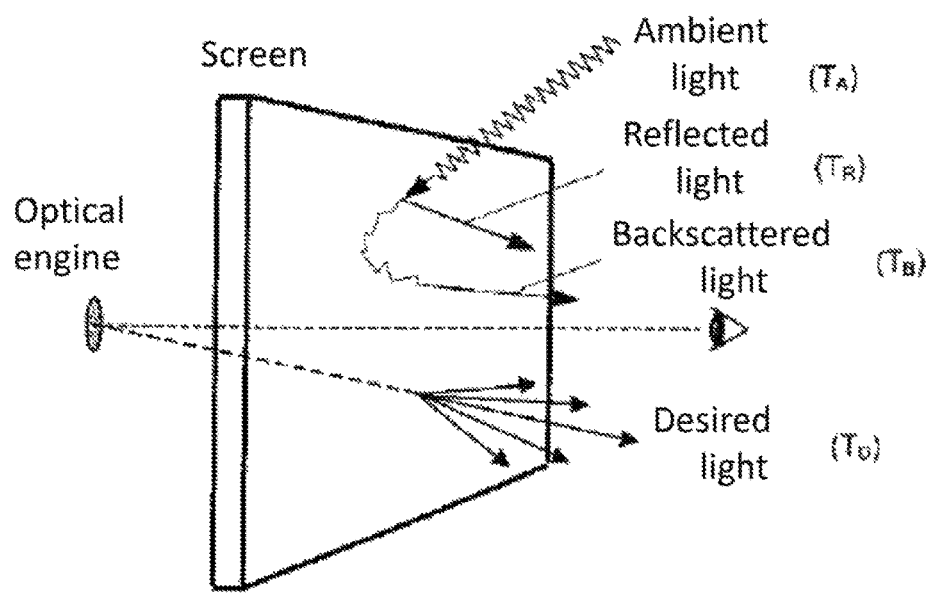
FIG. 8 illustrates backscattered light and surface reflection for a screen as used in embodiments of the present invention.

The reflected light has two components: backscattered light from the diffusers in the resin and surface reflection that depends on the surface characteristics of the coating (see FIG. 8).

Measured backward scattering for normal incidence on an embodiment of the present invention is shown in FIG. 9.

Compared with the forward scattering, the backward scattering is more specular. The stronger specular reflection results in a substantially higher contrast ratio.

The backward scattering has a relative small scattering angle. This is explained as follows:
a) because of the absorption α of the light in the light absorber such as dye or particles of the inner layer
b) and the average traveling distance of the light for back reflection is 2 times the average traveling distance of the light for the forward direction a thinner layer (average thickness δ<t) of the inner-layer will contribute to the backscattering and will consequently have a smaller scattering angle.

Resolution

In accordance with embodiments of the present invention light absorbing material is present in, e.g. is added to the inner layer of the screen, e.g. a dark material such as a black dye or pigment is added to the inner-layer to reduce the blurring effect of the diffuser and realize an image with a high MTF-value. Pigments, tints or inherent light absorbing properties of materials can be used to achieve this in accordance with the present invention. One example is carbon particles.

Absorption coefficient α of the inner-layer.

Concentration of dark material such as a black dye or pigment=$c_{dye}$ (Consider for simplicity of the notation 1 dimensional case).

We assume an impulse response function I(x) centered around x=0 and symmetrical around x=0 for an inner layer without absorbing dye. If we now assume to add a dark material such as a dark dye or pigment with absorption coefficient α. For larger |x|-values the light has to travel (on the average) a longer distance through the inner-layer and consequently undergoes a stronger absorption. The point spread function for an inner-layer with a dark material such as a dye or pigment with absorption coefficient α is therefore:

$$I(x) \cdot \exp(-\alpha \cdot f(x)).$$

$$f(x) = f(-x), f(x) > 0 \text{ and } \frac{df(x)}{dx} > 0.$$

This explains the strong reduction on MTF degradation when a dark material such as a dye or pigment is added.

Speckle Noise

Although the light of a projection system is not monochromatic and is produced by an extended light source the images formed on screens can show speckle noise. By the van Cittert-Zernike theorem the coherence width can be calculated (M. Born and E. Wolf, *Principles of Optics*). For a projection lens with opening 2 θ' the coherence area diameter is given by:

$$\Delta D = \frac{\lambda}{\sin(\theta')}$$

For a projection system with magnification m and f-number F/# this gives:

$$\Delta D = 2 \cdot \lambda \cdot m \cdot F/\#$$

Projectors with small light modulators (diagonal ~1 inch) require large magnification and because the f-number in such projectors is around 2.5 the area of high degree of coherence is relative large. This means that light from such an area, when scattered, can interfere and produce speckle noise at the receptor side.

EXAMPLE

For λ=550 nm, m=80 and F/2.5 we have a coherence width of 220 μm; (θ'≈2.5·10⁻³ rad)

A diffuser layer with scattering cone angle 140° has a coherence area with diameter ≈0.59 μm.

The eye has a resolving power of approximately 1 arc-minute=0.29·10⁻³ rad and has a resolution cell of diameter ≈436 μm at a viewing distance of 1.5 m. The number of statistically independent coherence areas in an eye resolution spot is in this case approximately 500·10³. The speckle noise will be effectively reduced by this diffuser. ("*Speckle-free rear-projection screen using two close screens in slow relative motion*", E. Rowson, A. Nafarrate, R. Norton, J. Goodman, J. Opt. Soc. Am. Vol. 66, No. 11, November 1976).

In accordance with an aspect of the present invention a tinted inner layer (α, t) with scattering particles (d, c, Δn, n1<n2) conserves a sharp image with a low MTF degradation for a suitable choice of the parameters α, t, d, c and Δn. This is applicable on flat screens and on curved screens. However different parameters are required for curved screens than flat screens.

In accordance with an aspect of the present invention a tinted inner layer (having an absorption α) with scattering particles (d, c, Δn, n1<n2) can realize a forward scattering approximating a Lambertian emitter (half-gain angle ≥50°) and a backward scattering approximating a specular reflector for a suitable choice of α, d, c, Δn.

In accordance with an aspect of the present invention a contrast ratio >10:1 can be realized inside a screen with a certain curvature when the forward scattering approximates a Lambertian emitter and the backward scattering approximates a specular reflector.

In accordance with an aspect of the present invention a low speckle noise level can be realized with a suitable choice of the parameters d, c, t, Δn. This is applicable on flat screens and on curved screens.

In accordance with an aspect of the present invention a low speckle noise level can be realized in combination with a good conservation of the screen MTF. This is applicable on flat screens and on curved screens.

In accordance with an aspect of the present invention the optimal α (absorption coefficient) for a curved screen or dome need not be the same as for a planar structure.

In accordance with an embodiment of the present invention the value of α suitable for a dome is around 1650 per meter for a coating thickness of 560 μm which leads to a product of the two, α*d=0.924. α*d is a dimensionless constant. As the absorption is dependent on the product α* thickness d, the product of the two is a useful parameter for assessing the quality of such a coating.

For another embodiment value of α suitable for a dome is around 3000 per meter for a coating thickness of 560 μm which leads to a product of the two, α*d=1.64.

For yet another embodiment value of α suitable for a dome is around 4200 per meter for a coating thickness of 560 μm which leads to a product of the two, α*d=2.3.

The value of α*d is useful for the coating composition ranges described below in the table with reference to the present invention and is believed to be more or less independent of the exact nature of the binder/polymer+additives used. For example, a suitable range would be 0.8 to 1.2 for α*d or 0.5 to 1.5 for α*d or under some conditions 0.1 to 2 for α*d. More heavily tinted layers provide better results for contrast and/or resolution so that other suitable ranges are 0.1 to 5 for α*d or for example are 0.5 to 5 for α*d.

It is not expected that the materials used to obtain an absorption α have a significant effect on the present invention which is not limited to a specific tint or additive e.g. carbon nor to a specific concentration for the tint (e.g. in ppm).

In accordance with an aspect of the present invention the Gr (the gain for backscattering) is at large angles a function of mainly α. In accordance with an aspect of the present invention an optimal result is obtained for Gr<0.1 for an angle >40°. For example a preferred value would be Gr<0.07.

Embodiments of the present invention make use of a range parameters for the inner layer coating of the screen as given below:

| Range parameters coating dome: | | | min | max |
|---|---|---|---|---|
| Diameter spherical particles | d | [μm] | 2.0 | 40.0 |
| Weight concentration spherical particles | c | [%] | 1 | 25 |
| Thickness coating (inner-layer) | t | [μm] | 200 | 2000 |
| Absolute value difference spherical diffusive particles and resin | \|Δn\| | [—] | 0.01 | 0.15 |
| Absorption coefficient | α | [m-1] | 200 | 6000 |

The particles may be made of polyorgano-silsesquioxane for example and the resin material in which they are embedded can be an acrylic polymer such as PMMA. The light absorbing pigment can be carbon particles.

Difference forward scattering (transmissive gain) and backward scattering (reflective gain).

The difference between the forward scattering and backward scattering characteristics is an important aspect of this invention.

A meaningful and practical measure for difference between the forward scattering and backward scattering is the difference of the transmissive gain and the reflective gain. The ratio of $$\frac{\Delta g_t(\varphi)}{\Delta \varphi} \text{ and } \frac{\Delta g_r(\varphi)}{\Delta \varphi}$$

is a good measure for the difference between the transmissive gain and the reflective gain.

$g_t(\varphi)$: transmissive gain $g_r(\varphi)$: reflective gain $\varphi$: viewing angle $$g_t(\varphi) \equiv \frac{\pi \cdot L(\varphi) \cdot S}{\Phi}$$

Φ is the incident light flux of a collimated light beam on an area S of the screen. L(φ) is the measured luminance (see FIGS. 8 and 9).

$$g_r(\varphi) \equiv \frac{\pi \cdot L(\varphi) \cdot S}{\Phi}$$

Figure 12:
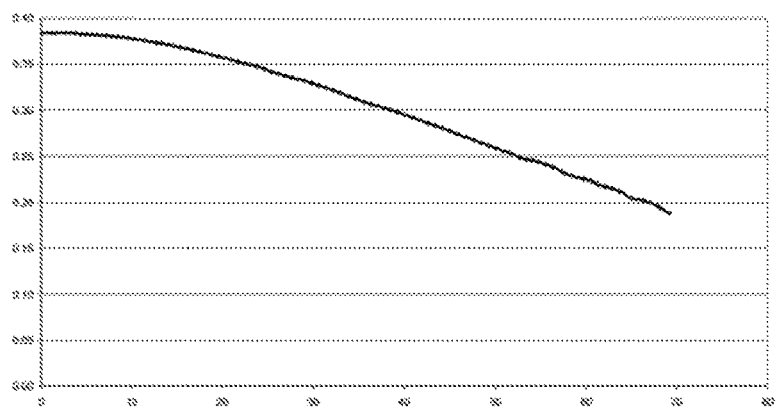
FIG. 12 shows values for transmission gain on a coating according to an embodiment of the present invention.
Figure 13:
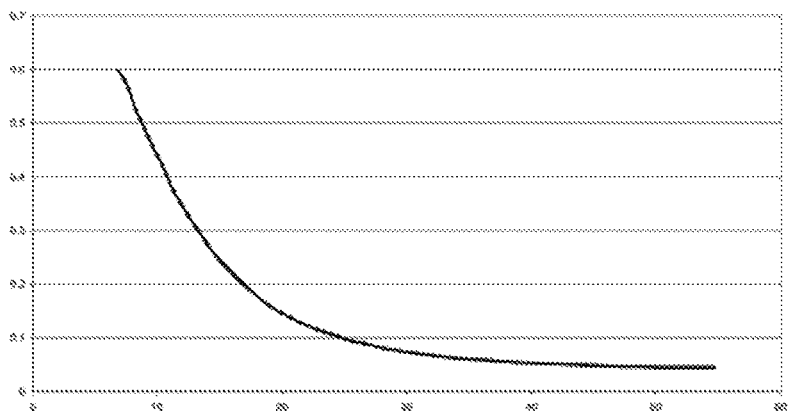
FIG. 13 shows values for reflection gain on a coating according to an embodiment of the present invention.

Values for measured on materials according to embodiments of the present invention for reflective and transmissive gain are shown in FIGS. 12 and 13.

From the measurement $g_t(\varphi)$ and $g_r(\varphi)$ we can calculate:

$$\left|\frac{\Delta g_t}{\Delta \varphi}\right| \text{ for } 10 \ deg < \varphi < 40 \ deg \ \Delta\varphi = 30 \ deg$$

and $$\left|\frac{\Delta g_r}{\Delta \varphi}\right| \text{ for } 6 \ deg < \varphi < 15 \ deg \ \Delta\varphi = 10 \ deg$$

$$\frac{\Delta g_t}{\Delta \varphi} \approx -0.165 \ rad^{-1}$$

$$\frac{\Delta g_r}{\Delta \varphi} \approx -2.28 \ rad^{-1}$$

$$\frac{\left|\frac{\Delta g_r}{\Delta \varphi}\right|}{\left|\frac{\Delta g_t}{\Delta \varphi}\right|} > \gamma$$

In this case is γ≈14

γ is preferably sufficiently large to obtain the required balance between the characteristics: luminance, contrast ratio and image sharpness.

In accordance with embodiments of the present invention a sufficiently large value is γ>7.

Another important condition to achieve a high CR is the value of the reflective gain $g_r(\theta)$ for large θ: $g_r(\theta)<0.1$ for θ>40 deg.

An important aspect of the present invention is a coating for a rear projection dome having the shape described in the present invention. The present invention provides a high quality rear projection screen coating for the inside of a transparent dome. Based on the formula for the square root integral (=SQRI) one can calculate that the requirements for a dome screen coating are different from the requirements of a general flat screen coating. The square root integral is the number for the image quality of a display. It's expressed in units of just noticeable differences. The bigger this value, the higher the screen quality. Very important is the influence of unwanted light on the contrast ratio. In case of a flat screen this unwanted light is ambient light at a certain constant level. In case of an aspherical screen this unwanted light is light reflected by the screen coating due to the integrating character of an aspherical screen according to the present invention. All projected light that does not end up in the observer's eye immediately after scattering through the coating may end up in the observer's eye after multiple reflections on the aspherical screen. Therefore, the dark zones on the screen are illuminated by the bright zones, i.e. the contrast ratio of the aspherical screen is diminished.

Influence of ambient light on the modulation depth

For a certain spatial frequency the SQRI is proportional to the square root of the modulation depth divided by the threshold modulation. Contrast sensitivity of the human eye and its effects on image quality, P. G. J. Barten, Contrast Sensitivity of the human eye and its effects on image quality, ISBN 90-9012613-9, p 157. If we assume a constant luminance level, the threshold modulation is also constant and so we can focus on the ambient light influence on the modulation depth. The modulation depth or contrast modulation M is defined as the ratio of the amplitude of the luminance variation to the average value of the luminance.

$$M = \frac{L_{max} - L_{min}}{L_{max} + L_{min}} = \frac{\Delta L}{2\langle L \rangle} \quad (1)$$

in which $\Delta L$ is the difference between maximum and minimum luminance and $\langle L \rangle$ is the average luminance.

Ambient light will have an equal impact on the maximum and the minimum luminance. The expression for the modulation depth changes to $$M' = \frac{(L_{max} + A) - (L_{min} + A)}{(L_{max} + A) + (L_{min} + A)} = \frac{\Delta L}{2\langle L + A \rangle} = M \frac{1}{1 + \frac{A}{\langle L \rangle}} \quad (2)$$

where A is the ambient light luminance as seen by the observer after reflection on the screen.

In case of a flat screen this ambient light luminance A is constant. The larger the ambient light level the bigger the decrease in modulation depth and the smaller the SQRI value. To diminish the ambient light influence it makes sense to raise the light level of the display.

In case of an aspherical screen (as an example of a curved screen) this ambient light luminance A is proportional to the average luminance in the dome. The expression for the modulation depth is in this case:

$$M' = M \frac{1}{1 + \frac{\beta \langle L \rangle}{\langle L \rangle}} = M \frac{1}{1 + \beta} \quad (3)$$

Raising the light level of the display has no influence on the modulation depth, it is mandatory to decrease $\beta$.

Influence of absorptive materials such as pigments or dyes on the modulation depth Suppose the screen coating contains at least one layer such that the coating absorption can be characterized by an absorption coefficient $\alpha$ and a thickness d.

The light that passes once through the layer is attenuated by $\exp(-\alpha d)$ $$L'_{max} = L_{max} \cdot e^{-\alpha d}$$

$$L'_{min} = L_{min} \cdot e^{-\alpha d} \quad (4)$$

The ambient light passes twice through the layer and is attenuated by $\exp(-2\alpha d)$ $$A' = A \cdot e^{-2\alpha d} \quad (5)$$

$$\beta' \langle L' \rangle = \beta \cdot e^{-\alpha d} \langle L \rangle \cdot e^{-\alpha d}$$

For a flat screen this results in following expression for the modulation depth $$M' = M \frac{1}{1 + \frac{A \cdot e^{-\alpha d}}{\langle L \rangle}} \quad (6)$$

For an aspherical screen according to the present invention this results in following expression for the modulation depth:

$$M' = M \frac{1}{1 + \beta \cdot e^{-\alpha d}} \quad (7)$$

In realistic rear projection situations the ambient light A is only a fraction of the average display light $\langle L \rangle$, let say 0.1. Therefore no absorption or only a limited absorption is necessary to preserve a good modulation depth (equation 6).

For an aspherical screen according to the present invention there is no way to preserve the modulation depth except by increasing the absorption (equation 7).

Now let us aim for the same modulation depth in both cases, flat screen and aspherical screen according to the present invention. This imposes that $$\frac{A \cdot e^{-\alpha_1 d}}{\langle L \rangle} = \beta \cdot e^{-\alpha_2 d} \quad (8)$$

where we assumed a similar coating thickness. Since A is the ambient light luminance as seen by the observer after reflection on the screen, therefore it can be written as $$A = \beta' \cdot A' \quad (9)$$

In which A' is the luminance of the incident ambient light and $\beta'$ is a reflectance value, which is slightly bigger than the value of $\beta$. Theoretically in the limit these can be equal. For realistic projection situations, the ambient light A is a fraction of the average luminance of the screen, let us say 20% of the average luminance. This gives the following equation for the reflectance values $$\frac{\beta' \cdot e^{-\alpha_1 d}}{5} = \beta \cdot e^{-\alpha_2 d} \quad (10)$$

If we neglect the small difference between the reflectance values, i.e. if we assume $$\beta' \approx \beta \quad (11)$$

We get the following equation for the difference in absorption factors $$\alpha_2 - \alpha_1 = \frac{\ln(5)}{d} \quad (12)$$

I.e. for a similar image quality the absorption factor of the aspherical screen coating should be $\ln(5)/d$ higher than the absorption factor of the flat screen coating. I.e. the aspherical screen should absorb a lot more than a flat screen to result in a similar image quality. If we assume a coating thickness of 350 micron, we end up with a difference of $$\alpha_2 - \alpha_1 = 4600 \left[ \frac{1}{m} \right] \quad (13)$$

This means that the difference between $\alpha^* d$ for a flat screen and an aspherical screen with the same thickness of coating is $4600 \times d$. Thus the aspherical screen coatings in accordance with embodiments of the present invention differ significantly in the value of $\alpha^* d$ compared with conventional coatings for back-projection flat screens.

Adding absorbing materials

Adding absorbing materials to at least one layer has serious consequences. The coating can be extremely sensitive to thickness variations, which is obvious when looking at the exponential factor in the equation for the luminance (equation 4). In order to achieve an acceptable luminance uniformity, the thickness variation has to be controlled meticulously. One possible approach to apply this coating is by spray painting. If the local brightness variation is restricted to 3%, the local thickness variation may have to be less than 2.7% for a certain coating configuration. If the local brightness variation is restricted to 5%, the local thickness variation may have to be less than 4.5% for a certain coating configuration.

In accordance with a preferred embodiment the coating is applied to the inside of the dome by means of spraying. The coating is preferably applied as an aqueous suspension. Of the kinds of spraying that can be used airless spraying is less preferred because the thickness uniformity is not good. The coating is preferably applied with a good surface quality since this is important for the thickness tolerance. Thickness variations when viewed in transmission from the inside of the aspherical screen are easily seen by the eye and are disturbing. Further a rather thick layer has to be applied e.g. >70 μm. From experiment, it has been found that conventional air spraying methods are also not very suitable. In accordance with an embodiment of the present invention either an air assisted method is preferred or a rotational bell cup method is preferred. The air assisted method is a method that lies between airless and conventional spraying techniques. Air assisted spraying typically uses air pressure and fluid pressure of 2,100-21,000 kPa to achieve atomization of the coating. This equipment provides high transfer and increased application.

The fluid pressure is provided by an airless pump, which allows much heavier materials to be sprayed than is possible with an airspray gun. Compressed air is introduced into the spray from an airless tip (nozzle) to improve the fineness of atomisation.

A rotational bell cup method uses a rotary atomizer as a paint applicator. The typical bell applicator consists of four or five major elements: the valve module, the bell cup, the turbine, the shaping air shroud, and optionally an electrostatic system.

The valve module is a manifold consisting of passages for paint, solvent, and compressed air, and valves to control the flow of materials for paint delivery, cleaning and purging with solvent, and management of compressed air to the valves, turbine, and shaping air shroud. The bell cup is a conical or curved disc fixed to the shaft of the turbine. Paint is injected into the center of the rear of the disc, and is atomized by being forced out to the edge of the cup by centrifugal forces. The flow of the paint over the cup and off the edge breaks up the paint into atomized droplets.

The turbine is a high speed, high precision air motor that rotates the bell cup at speeds ranging from 10,000 rpm to 70,000 rpm, depending on the cup diameter, atomization desired, and physical properties of the paint. Typical turbines for this application use an air bearing, where the spinning shaft is suspended in a cushion of flowing compressed air, with virtually no frictional resistance. The shaping air shroud, or shaping air ring, is simply a ring with passages for air to flow out the front of the atomizer, outside of the cup diameter, to manage the size of the spray pattern produced. As more air is forced through the shroud, the atomized paint is forced into a smaller pattern.

The electrostatic system is optional and can be internal or external (or direct or indirect charge), and supplies high voltage (30,000 to 100,000 volts DC) charge to the applicator, or the air surrounding it. This has the effect of negatively charging the paint, while causing a region of positive charge to form on the workpiece, resulting in electrostatic attraction between the paint and the workpiece. The electrostatic system is visible only on an external (or indirect) charge applicator, where it appears as a series of 4-8 forward-facing electrodes in a circular array around the bell.

Figure 14:
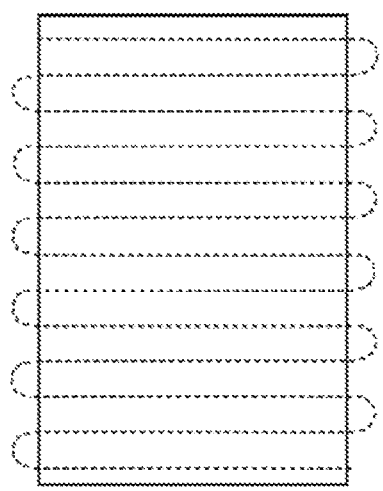
FIGS. 14 and 15 show spraying patterns for applying coating in accordance with embodiments of the present invention
Figure 15:
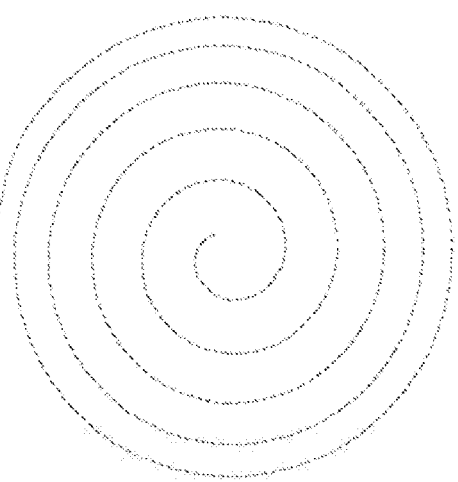

Since thickness tolerance is so important and the geometry on the inside of an aspherical dome is complicated, it is very important to calculate a customized spray path. It is preferred if the spray path does have any overlaps. This means that each pass of the spraying head abuts the previous path. In case of a rectangular substrate the path this is straightforward (see FIG. 14). In case of an aspherical substrate the path is less straightforward. In accordance with embodiments of the present invention the substrate can be kept static and the spray head moves preferably under the control of a robot, or the dome is made to move and the spray head is kept sensibly still or the dome is made to move and the spray head is also allowed some movement. In the case of a static dome it is preferred to use a substantially circular spray pattern, as for instance the spray pattern from a round beam or rotational bell. The path may be similar to a spiral (FIG. 15). In the case of a dynamic movement of the aspherical substrate, this may rotate around its rotational axis. In that case it may also be possible to use a flat beam spray technique.

For all the spray techniques multiple layers (e.g. 6-9) are applied. In one embodiment a mix diffusive and absorbing layers are used (e.g. 10-13 layers) rather using a single paint composition so for example alternating diffusive and absorbing layers can be applied.

Figure 16:
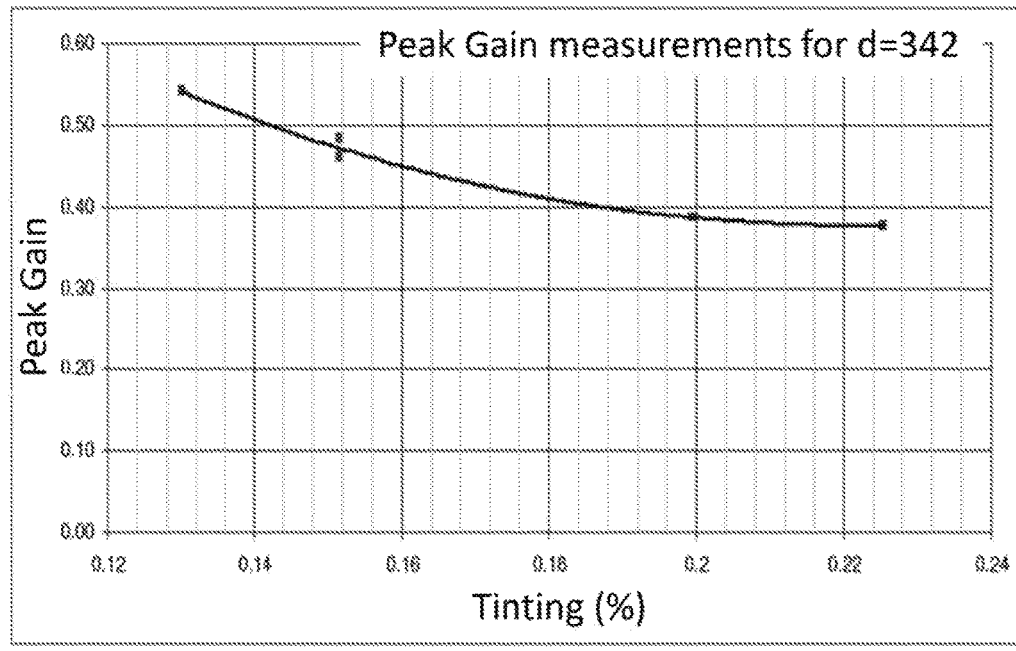
FIG. 16 shows the relationship between % of tinting additive to peak gain as obtained with coatings in accordance with embodiments of the present invention.

FIG. 16 shows the relationship between % of tinting additive to peak gain as obtained with coatings in accordance with embodiments of the present invention. The percentage of tinting material is based on the liquid paint for spraying which has 52% solid matter. Hence to obtain the percentages of absorbtive material in the final coating the values on the X axis of this graph must be divided by 0.52.

While the invention has been described hereinabove with reference to specific embodiments, this was done to clarify and not to limit the invention. The skilled person will appreciate that various modifications and different combinations of disclosed features are possible without departing from the scope of the invention.

The invention claimed is:

1. A visual system comprising a non-spherical dome display screen; wherein the non-spherical shape of the screen is such that it comprises an axis of revolution preferably perpendicular to a horizontal plane and substantially forms a surface of revolution around said axis of revolution and has a thickness, said surface of revolution being formed by the rotation around the axis of revolution of a planar curve, each point on the planar curve being defined by an angle and a radius, the plane curve having at least one section where the radius of curvature increases or decreases monotonically with change of said angle;

wherein the non-spherical shape of the screen has a minimum radius of curvature R1 and a maximum radius of curvature R2 where R2 differs from R1 and where the non-spherical shape of the screen has been optimized for the viewer's ergonomics by integrating the radius of curvature of the screen surface through the formulas $$\frac{\partial R}{\partial \Phi} = C_2 \pm e(\phi, \theta) \text{ and } \frac{\partial R}{\partial \theta} = C_1 \pm e(\phi, \theta)$$

where $C_1$ and $C_2$ are constants and $e(\phi,\theta)$ is a variable tolerance factor on these constants that is in absolute values smaller than $C_1$ and $C_2$ for all $\theta$ and $\varphi$ values and where $\theta$ is the angle of the screen point P in the horizontal plane and $\varphi$ is the zenith angle, or by integrating the radius of curvature of the screen surface through the formulas $$\frac{\partial R}{\partial \Phi} = C_2 \pm e \text{ and } \frac{\partial R}{\partial \theta} = C_1 \pm e$$

where $C_1$, $C_2$ and e are constants and $\theta$ is the angle of the screen point P in the horizontal plane and $\varphi$ is the zenith angle.

2. The visual system according to claim 1, wherein the non-spherical shape of the screen has a first arc and a second arc with respectively a first and second radius of curvature R1 and R2, wherein the first arc is located in the upper part of the screen and the second arc is located in the lower part of the screen, and is such that R1<R2.

3. The visual system according to claim 1, wherein the screen is surrounded by at least a first group of projectors configured to display images for a user located inside the non-spherical dome screen, wherein the first group of projectors comprises at least 3 projectors arranged around the periphery of the screen in a horizontal plane so as to provide a combined image having a horizontal field of view of at least 180° and a vertical field of view in the range of at least 20° downward to 60° upward.

4. The visual system according to claim 3, further comprising a second group of projectors, wherein the second group of projectors comprises at least one projector configured to illuminate the upper part of the screen, and provides an additional vertical field of view up to 90° being the zenith.

5. The visual system according to claim 4, wherein the second group of projectors comprises at most four projectors.

6. The visual system according to claim 3, wherein the first group of projectors comprises at most nine projectors.

7. The visual system according to claim 3, further comprising mirrors associated to the first and/or a second group of projectors so as to fold the light beam projected by the projectors.

8. The visual system according to claim 3, wherein the first group of projectors are arranged so as to cover a horizontal field of view up to 360°.

9. The visual system according to claim 3, wherein the screen is surrounded by at least a first group of projectors configured to display images for a user located inside the non-spherical dome screen, wherein the first group of projectors comprises at least 3 projectors arranged around the periphery of the screen in a horizontal plane so as to provide a combined image having a horizontal field of view of at least 180° and a vertical field of view in the range of at least 20° downward to 50° upward.

10. The visual system according to claim 1, wherein the variation of the radius of curvature along the planar curve $$\frac{\partial R}{\partial \Phi} = C_2 \pm e(\phi, \theta)$$

or $\pm e$ wherein $C_2$ is a constant in the range of 0.5% and 5% of the radius R2 per degree and where the absolute value of e or $e(\phi,\theta)$ is less than 2% of R2 per degree.

11. The visual system according to claim 1, wherein the variation of the radius of curvature along the azimuthal angle is given by $$\frac{\partial R}{\partial \theta} = C_1 \pm e(\phi, \theta) \text{ or } \pm e$$

wherein $C_1$ is a constant in the range of 0% to 2.5% of the radius R2 per degree and where the absolute value of e or $e(\phi,\theta)$ is less than 2% of R2 per degree.

12. The visual system according to claim 11, further comprising a second group of projectors, wherein the second group of projectors comprises at least one projector configured to illuminate the flat upper part of the screen, and provides an additional vertical field of view up to 90° being the zenith.

13. The visual system according to claim 1, wherein the vertical field of view is at most of −50° downward and a full 90° upward with 2 layers of projectors.

14. The visual system according to claim 1, wherein $C_1$ is preferably as small as possible having a value different from zero determined by the space constraints of the location in which the system needs to be installed.

15. The visual system of claim 1, having one layer of projectors with each projector covering between 40° and 90° horizontal field of view with between four and nine projectors to cover the total horizontal field of view.

16. The visual system of claim 15, that has two layers of projectors, one layer around the periphery with each projector covering between 40° and 90° horizontal field of view and 1 layer of projectors on the zenith area covering at least the screen part that has a zenith angle between 75° and 90°.

17. The visual system of claim 16 that has but-matched projectors with a geometry but-matching accuracy of better than 10 arc minutes as seen from the center of the dome.

18. The visual system of claims 1 that has projectors configured to provide overlapping blended images.

19. The visual system according to claim 1, wherein the non-spherical dome screen is truncated.

20. A non-spherical dome screen for use in rear projection for a user located inside the dome screen, wherein
the shape of the screen is such that it comprises an axis of revolution preferably perpendicular to a horizontal plane and substantially forms a solid of revolution around said axis of revolution having an angle of curvature greater than 180°, said solid of revolution having a minimum radius of curvature R1 and a maximum radius of curvature R2 where R2 differs from R1 and where the non-spherical screen shape has been optimized for the viewer's ergonomics,
the screen comprising a first layer and a second diffusing layer on the first layer, the second diffusing layer containing a light absorbing material and light diffusing particles;

wherein the non-spherical shape of the screen has a minimum radius of curvature R1 and a maximum radius of curvature R2 where R2 differs from R1 and where the non-spherical shape of the screen has been optimized for the viewer's ergonomics by integrating the radius of curvature of the screen surface through the formulas $$\frac{\partial R}{\partial \Phi} = C_2 \pm e(\phi, \theta) \text{ and } \frac{\partial R}{\partial \theta} = C_1 \pm e(\phi, \theta)$$

where $C_1$ and $C_2$ are constants and $e(\phi,\theta)$ is a variable tolerance factor on these constants that is in absolute values smaller than $C_1$ and $C_2$ for all $\theta$ and $\varphi$ values and where $\theta$ is the angle of the screen point P in the horizontal plane and $\varphi$ is the zenith angle, or by integrating the radius of curvature of the screen surface through the formulas $$\frac{\partial R}{\partial \Phi} = C_2 \pm e \text{ and } \frac{\partial R}{\partial \theta} = C_1 \pm e$$

where $C_1, C_2$ and e are constants and $\theta$ is the angle of the screen point P in the horizontal plane and $\varphi$ is the zenith angle.

21. A method of operating a visual system comprising a non-spherical dome screen wherein a non-spherical shape of the screen is such that it comprises an axis of revolution preferably perpendicular to a horizontal plane and substantially forms a surface of revolution around said axis of revolution and has a thickness, said surface of revolution having a minimum radius of curvature R1 and a maximum radius of curvature R2 where R2 differs from R1 and where the non-spherical screen shape has been optimized for the viewer's ergonomics:

configuring at least a first group of projectors to display images onto the screen for a user located inside the dome screen,
back projecting images from the at least first group of projectors
the at least first group of projectors comprising at least three projectors arranged around the periphery of the screen in a horizontal plane so as to provide a combined image having a horizontal field of view of at least 180° and a vertical field of view in the range of at least 20° downward to 60° upward;
wherein the non-spherical shape of the screen has a minimum radius of curvature R1 and a maximum radius of curvature R2 where R2 differs from R1 and where the non-spherical shape of the screen has been optimized for the viewer's ergonomics by integrating the radius of curvature of the screen surface through the formulas $$\frac{\partial R}{\partial \Phi} = C_2 \pm e(\phi, \theta) \text{ and } \frac{\partial R}{\partial \theta} = C_1 \pm e(\phi, \theta)$$

where $C_1$ and $C_2$ are constants and $e(\phi,\theta)$ is a variable tolerance factor on these constants that is in absolute values smaller than $C_1$ and $C_2$ for all $\theta$ and $\varphi$ values and where $\theta$ is the angle of the screen point P in the horizontal plane and $\varphi$ is the zenith angle, or by integrating the radius of curvature of the screen surface through the formulas $$\frac{\partial R}{\partial \Phi} = C_2 \pm e \text{ and } \frac{\partial R}{\partial \theta} = C_1 \pm e$$

where $C_1, C_2$ and e are constants and $\theta$ is the angle of the screen point P in the horizontal plane and $\varphi$ is the zenith angle.

* * * * *